US012811643B2

(12) United States Patent
Huang et al.

(10) Patent No.: US 12,811,643 B2
(45) Date of Patent: Nov. 24, 2026

(54) SSB TRANSMISSION IN HOLOGRAPHIC-MIMO SYSTEM

(71) Applicant: QUALCOMM Incorporated, San Diego, CA (US)

(72) Inventors: Min Huang, Beijing (CN); Wei Xi, Beijing (CN); Chao Wei, Beijing (CN); Yu Zhang, San Diego, CA (US); Hao Xu, Beijing (CN); Danlu Zhang, San Diego, CA (US); Sony Akkarakaran, Poway, CA (US)

(73) Assignee: Qualcomm Incorporated, San Diego, CA (US)

( * ) Notice: Subject to any disclaimer, the term of this patent is extended or adjusted under 35 U.S.C. 154(b) by 363 days.

(21) Appl. No.: 18/566,612

(22) PCT Filed: Aug. 12, 2021

(86) PCT No.: PCT/CN2021/112312
§ 371 (c)(1),
(2) Date: Dec. 1, 2023

(87) PCT Pub. No.: WO2023/015525
PCT Pub. Date: Feb. 16, 2023

(65) Prior Publication Data
US 2025/0096864 A1 Mar. 20, 2025

(51) Int. Cl.
*H04B 7/06* (2006.01)
*H04L 5/02* (2006.01)
*H04W 72/0453* (2023.01)

(52) U.S. Cl.
CPC ........... *H04B 7/0617* (2013.01); *H04L 5/023* (2013.01); *H04W 72/0453* (2013.01)

(58) Field of Classification Search
CPC .. H04B 7/0617; H04B 7/06952; H04B 7/088; H04B 7/0695; H04B 7/0408;
(Continued)

(56) References Cited

U.S. PATENT DOCUMENTS

| | | | | |
|---|---|---|---|---|
| 10,972,199 B2 * | 4/2021 | Xiang | .................. | H04B 17/318 |
| 2019/0007147 A1 * | 1/2019 | Li | ........................ | H04B 17/318 |

(Continued)

FOREIGN PATENT DOCUMENTS

| | | |
|---|---|---|
| WO | 2020147065 A1 | 7/2020 |
| WO | 2021128233 A1 | 7/2021 |

OTHER PUBLICATIONS

International Search Report and Written Opinion—PCT/CN2021/112312—ISA/EPO—Apr. 20, 2022.

(Continued)

*Primary Examiner* — Olumide Ajibade Akonai
(74) *Attorney, Agent, or Firm* — Procopio, Cory, Hargreaves & Savitch LLP/Qualcomm

(57) ABSTRACT

A base station may select at least one of one or more 2D beams for at least one first SSB of a plurality of SSBs or one or more 3D beams for at least one second SSB of the plurality of SSBs. A UE may identify a beam type of at least one of one or more 2D beams for at least one first SSB of a plurality of SSBs or one or more 3D beams for at least one second SSB of the plurality of SSBs. The base station may transmit, to the UE, at least one of the at least one first SSB via the one or more 2D beams or the at least one second SSB via the one or more 3D beams.

30 Claims, 16 Drawing Sheets

(58) Field of Classification Search
CPC ........ H04B 7/0413; H04B 7/024; H04B 7/06; H04W 72/046; H04W 16/28; H04W 56/001; H04W 56/0005; H04W 56/003; H04W 24/10; H04W 72/1263; H04W 74/0833; H04L 5/0048; H04L 5/0053; H04L 5/0051; H04L 5/0023; H04L 5/0025; H04L 5/023
See application file for complete search history.

(56) References Cited

U.S. PATENT DOCUMENTS

| | | | | |
|---|---|---|---|---|
| 2021/0368456 | A1* | 11/2021 | Nilsson | H04B 7/0617 |
| 2022/0210841 | A1* | 6/2022 | Lin | H04W 74/0833 |
| 2023/0300890 | A1* | 9/2023 | Li | H04W 64/003 370/329 |

OTHER PUBLICATIONS

Partial International Search Report—PCT/CN2021/112312—ISA/EPO—Feb. 28, 2022.

* cited by examiner

700A

700B

SSB TRANSMISSION IN HOLOGRAPHIC-MIMO SYSTEM

CROSS-REFERENCE TO RELATED APPLICATION

This application claims the benefit of and priority to International Application No. PCT/CN2021/112312, entitled "SSB TRANSMISSION IN HOLOGRAPHIC-MIMO SYSTEM" and filed on Aug. 12, 2021, which is expressly incorporated by reference herein in its entirety.

TECHNICAL FIELD

The present disclosure relates generally to communication systems, and more particularly, to transmission of synchronization signal blocks (SSBs) in a holographic multiple-input-multiple-output (MIMO) wireless communication system.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE). The apparatus may identify a beam type of at least one of one or more two-dimensional (2D) beams for at least one first SSB of a plurality of SSBs or one or more three-dimensional (3D) beams for at least one second SSB of the plurality of SSBs. The apparatus may receive, from a base station, at least one of the at least one first SSB via the one or more 2D beams or the at least one second SSB via the one or more 3D beams. A beam type of the at least one of the one or more 2D beams or the one or more 3D beams may be associated with at least one of one or more frequency resources or one or more primary synchronization signal (PSS) or secondary synchronization signal (SSS) sequences.

In an aspect of the disclosure, a method, a computer-readable medium, and an apparatus are provided. The apparatus may be a base station. The apparatus may select at least one of one or more 2D beams for at least one first SSB of a plurality of SSBs or one or more 3D beams for at least one second SSB of the plurality of SSBs. The apparatus may transmit, to at least one UE, at least one of the at least one first SSB via the one or more 2D beams or the at least one second SSB via the one or more 3D beams. A beam type of at least one of the one or more 2D beams or the one or more 3D beams may be associated with at least one of one or more frequency resources or one or more PSS or SSS sequences.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
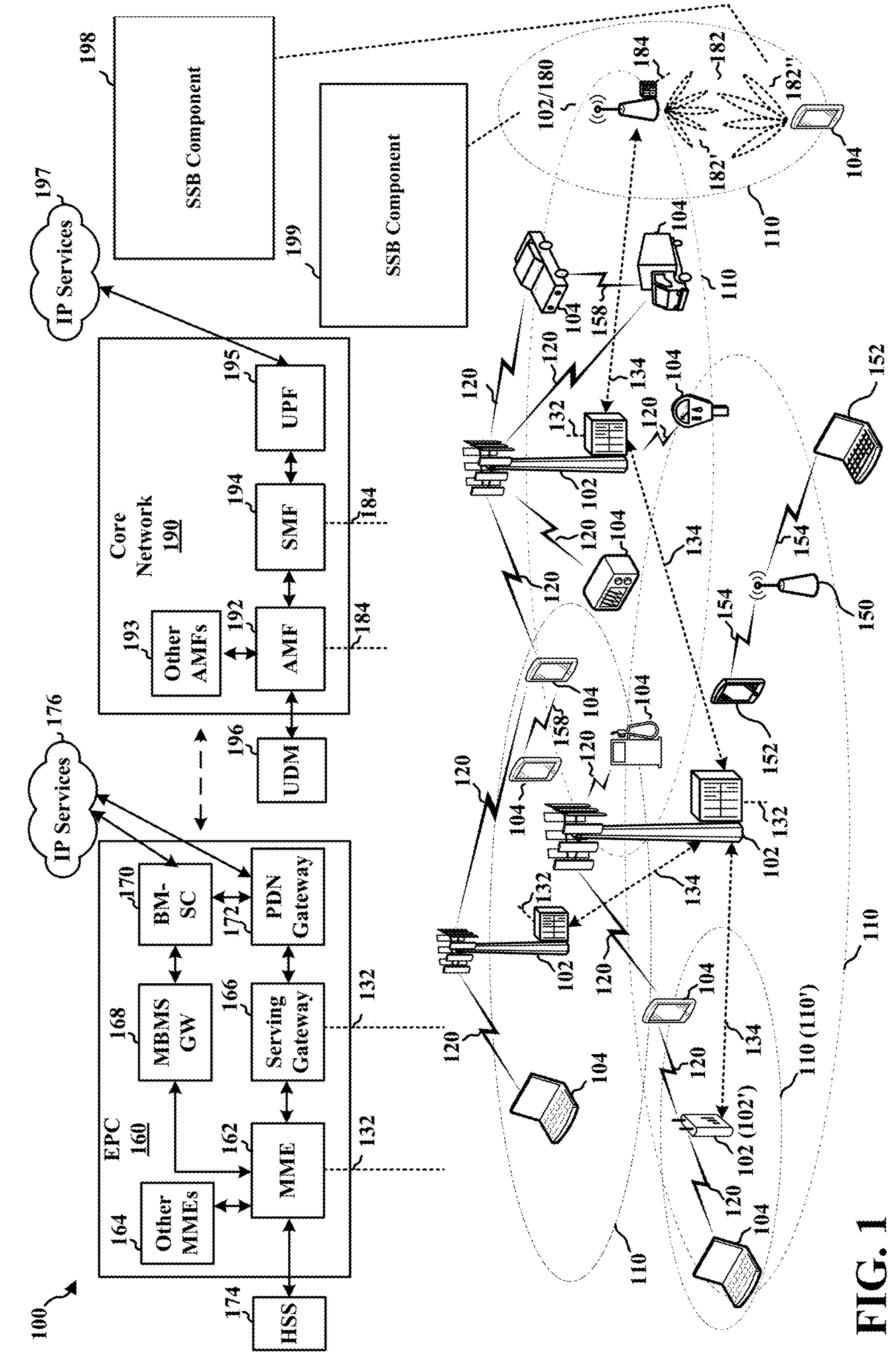
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., SI interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHZ, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHZ-7.125 GHZ) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHZ-71 GHz), FR4 (52.6 GHz-114.25 GHZ), and FR5 (114.25 GHZ-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHZ spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182''. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include an SSB component 198 that may be configured to identify a beam type of at least one of one or more 2D beams for at least one first SSB of a plurality of SSBs or one or more 3D beams for at least one second SSB of the plurality of SSBs. The SSB component 198 may be configured to receive, from a base station, at least one of the at least one first SSB via the one or more 2D beams or the at least one second SSB via the one or more 3D beams. A beam type of the at least one of the one or more 2D beams or the one or more 3D beams may be associated with at least one of one or more frequency resources or one or more PSS or SSS sequences. In certain aspects, the base station 180 may include an SSB component 199 that may be configured to select at least one of one or more 2D beams for at least one first SSB of a plurality of SSBs or one or more 3D beams for at least one second SSB of the plurality of SSBs. The SSB component 199 may be configured to transmit, to at least one UE, at least one of the at least one first SSB via the one or more 2D beams or the at least one second SSB via the one or more 3D beams. A beam type of at least one of the one or more 2D beams or the one or more 3D beams may be associated with at least one of one or more frequency resources or one or more PSS or SSS sequences. Although the following description may be focused on 5G NR, the concepts described herein may be applicable to other similar areas, such as LTE, LTE-A, CDMA, GSM, and other wireless technologies.

Figures 2A, 2B, 2C, 2D:
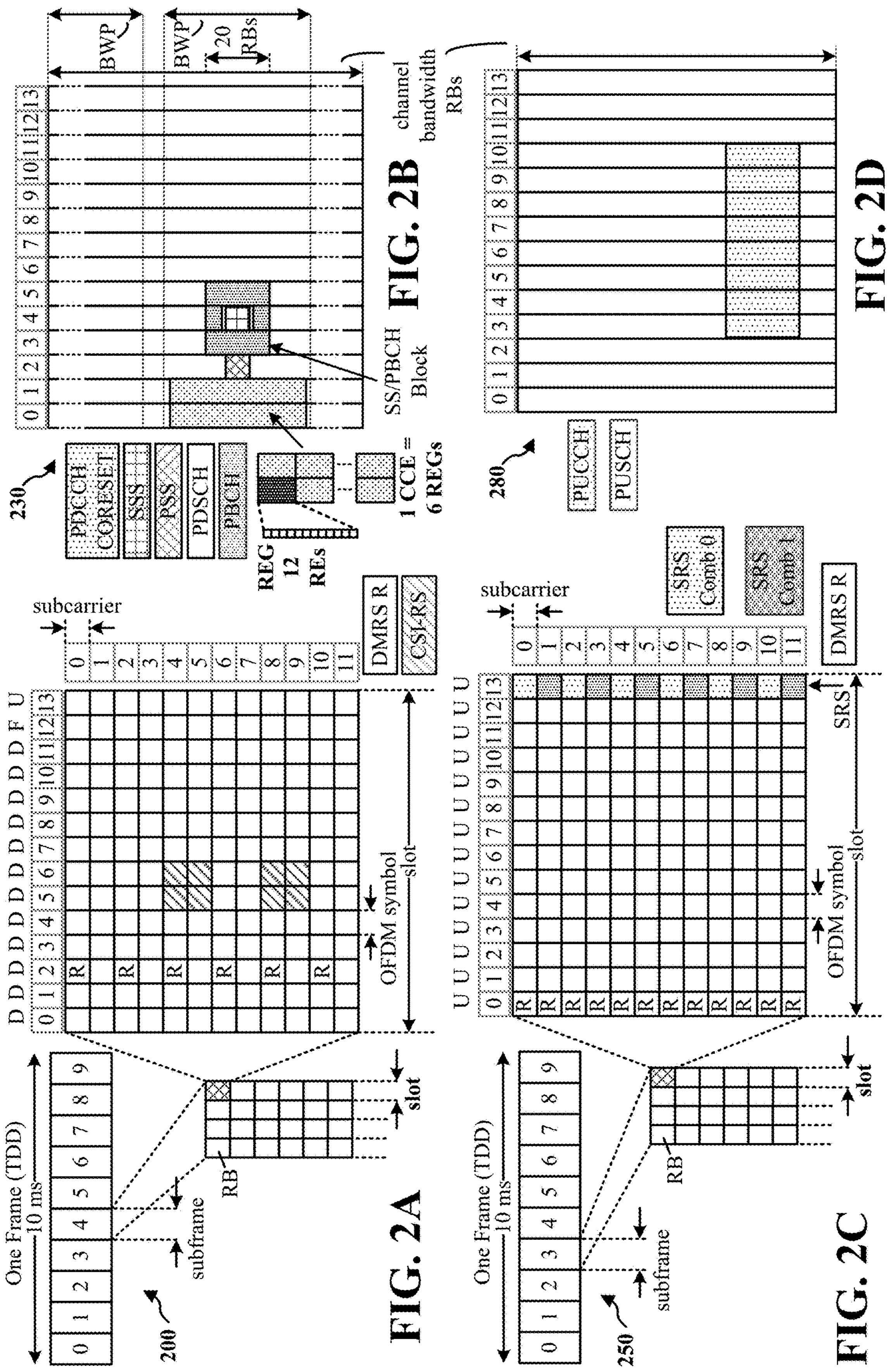
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and 24 slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
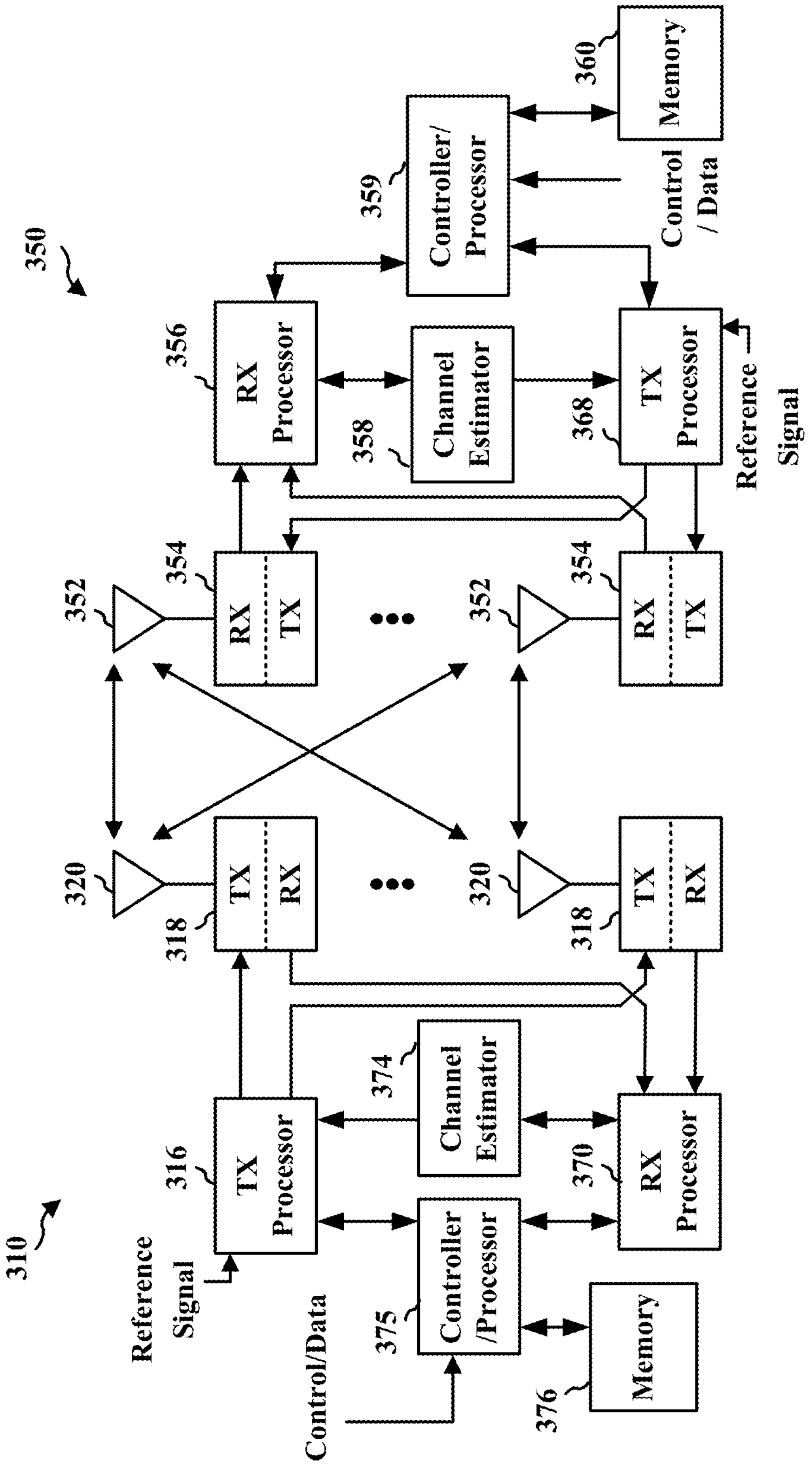
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

Figure 4A:
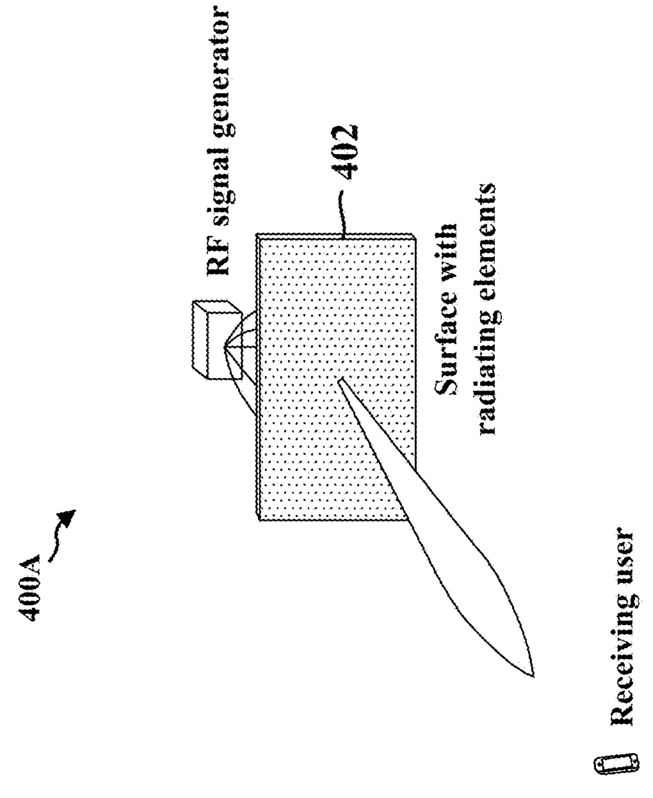
FIG. 4A is a diagram illustrating an active surface usable for holographic MIMO communications.
Figure 4B:
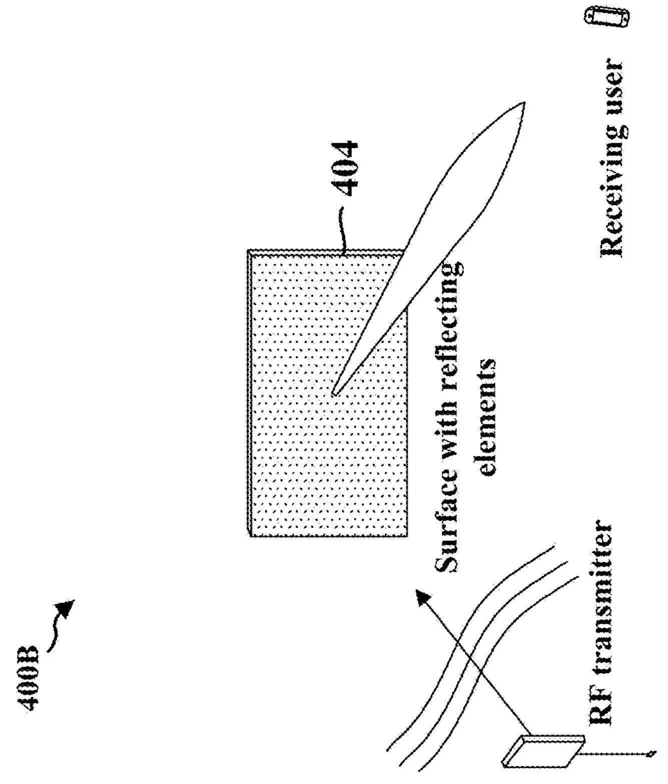
FIG. 4B is a diagram illustrating a passive surface usable for holographic MIMO communications.

One or more aspects described herein may relate to holographic MIMO communications. FIG. 4A is a diagram 400A illustrating an active surface usable for holographic MIMO communications. With an active surface 402, the RF signal may be generated at the backside of the surface 402, and may propagate through a steerable distribution network to radiating elements that may generate a beam. FIG. 4B is a diagram 400B illustrating a passive surface usable for holographic MIMO communications. With a passive surface 404, the RF signal may be sent from another location, and the metasurface may reflect the RF signal using steerable elements that may generate a beam.

Figure 5B:
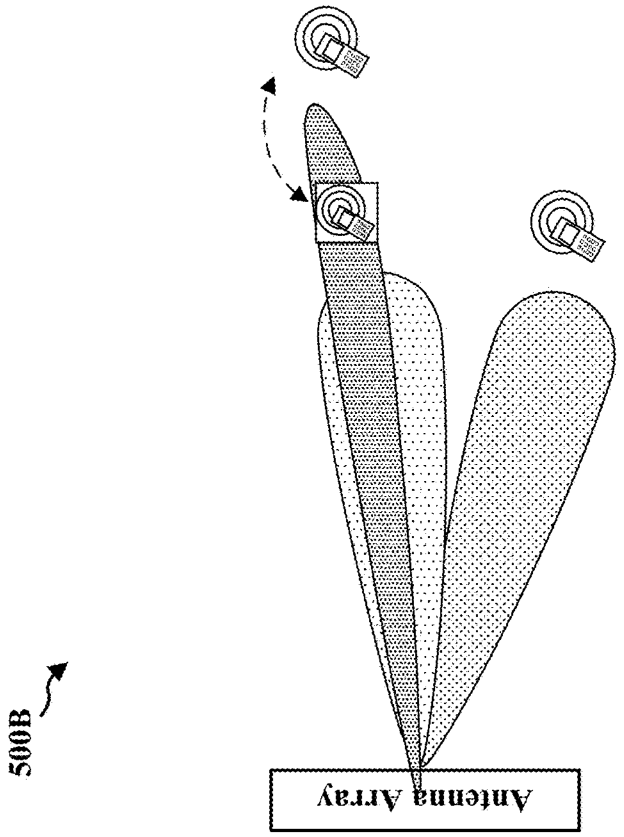
FIG. 5B is a diagram illustrating 3D beamforming in a wireless communication system.
Figure 5A:
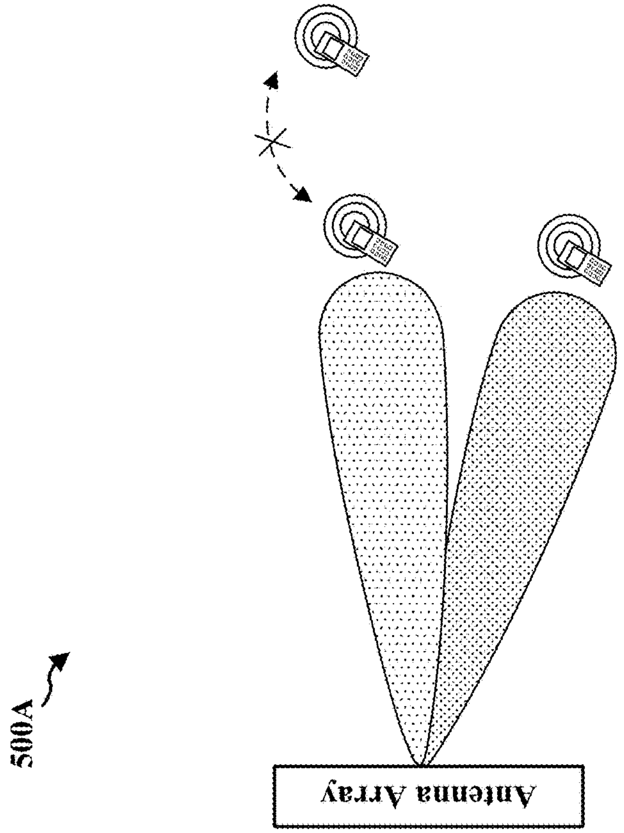
FIG. 5A is a diagram illustrating 2D beamforming in a wireless communication system.

FIG. 5A is a diagram 500A illustrating 2D beamforming in a wireless communication system. With 2D beamforming, 2D beams may be generated by an antenna array. The transmission power associated with a 2D beam may be concentrated in a particular direction, which may be described with angles in azimuth and zenith. For example, the angles may include an azimuth angle of departure (AoD), an azimuth angle of arrival (AoA), a zenith angle of departure (ZoD), or a zenith angle of arrival (ZoA).

2D beamforming may be associated with a number of disadvantages. For example, 2D beamforming may be associated with a lower multi-user (MU)-MIMO (MU-MIMO) opportunity. 2D beamforming may not be able to discriminate between UEs in the same direction but at different distances, and thus may not be able to pair such UEs for MU-MIMO transmission. This may result in a restricted MU pairing opportunity, a reduced MU diversity gain, and/or reduced cell-level spectral efficiency. Further, 2D beamforming may be associated with lower transmission power utilization efficiency. A 2D beam may cover the whole area corresponding to a certain angle or angle range. However, the target UE may be located at one particular spot area at a certain distance from the base station. Therefore, the transmission power landing in areas at other distances from the base station may be wasted.

FIG. 5B is a diagram 500B illustrating 3D beamforming in a wireless communication system. The coverage area close to the antenna panel may be referred to as the near field, and the coverage area further away from the antenna panel may be referred to as the far field. When the distance of a coverage area from the antennal panel is sufficiently short (the threshold distance may vary based on the panel size), the beam generated by the panel may be associated with holographic characteristics in this area. Such a beam may be associated with a particular direction and a particular distance, and may be referred to as a 3D beam or a holographic beam. A 3D beam may cover a certain angular range and a certain distance range. When a base station utilizes one or more 3D beams to transmit one or more data streams, the communication system may be referred to as a holographic MIMO system.

3D beamforming may be associated with a number of advantages. For example, 3D beamforming may be associated with a higher MU-MIMO opportunity. 3D beamforming may be capable of discriminating between UEs in the same direction but at different distances, and may pair such UEs for MU-MIMO transmission. This may result in an enhanced MU pairing opportunity, an enhanced MU diversity gain, and/or improved cell-level spectral efficiency. 3D beamforming may be associated with higher transmission power utilization efficiency. A 3D beam may cover the area of the target UE in terms of both the direction and the distance associated with the target UE. Therefore, the transmission power landing in areas in other directions or at other distances may be minimized. Accordingly, the transmission power utilization efficiency may be improved.

Figure 6:
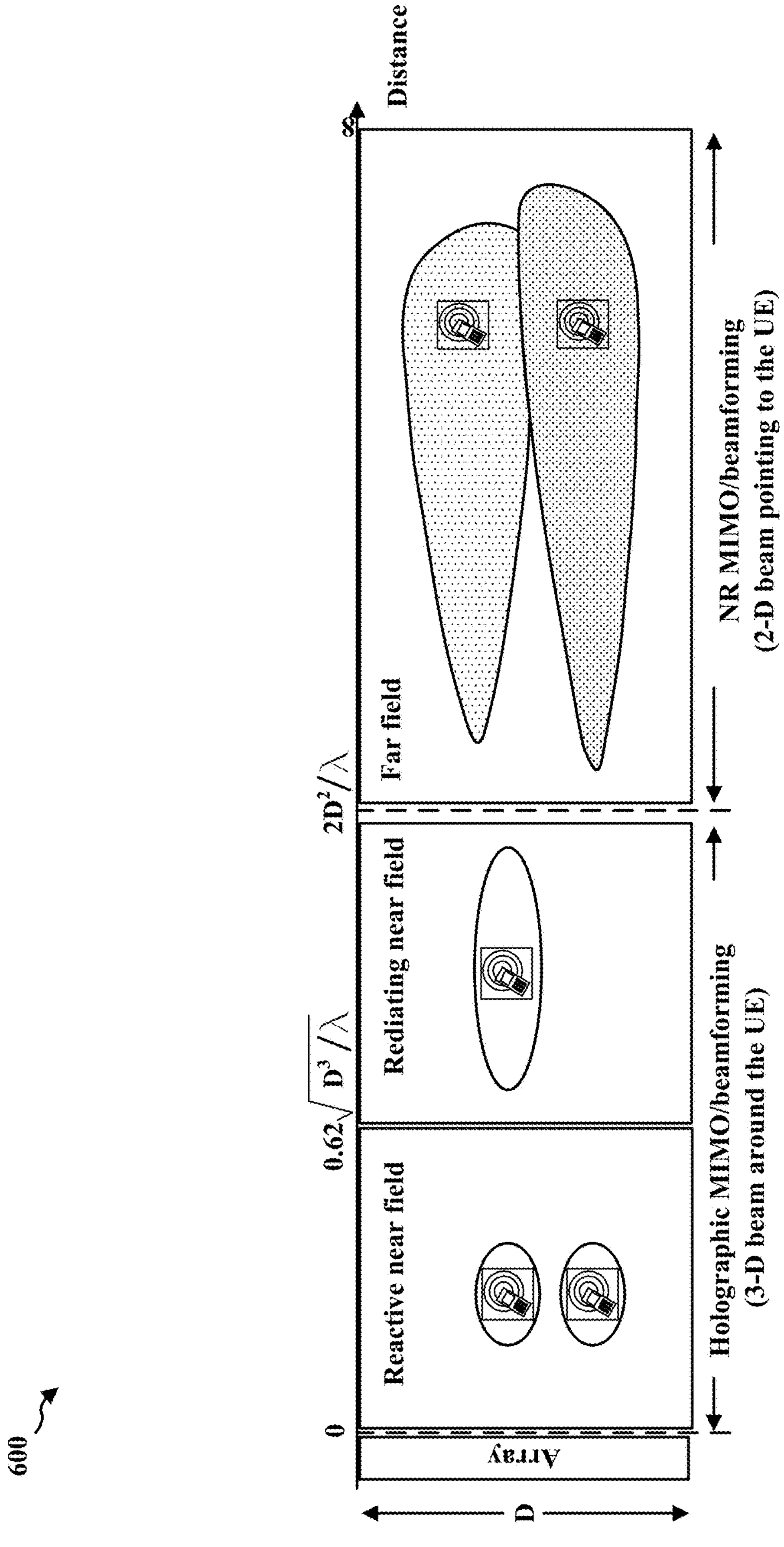
FIG. 6 is a diagram illustrating various fields associated with an antenna array.

FIG. 6 is a diagram 600 illustrating various fields associated with an antenna array. The coverage area of the antenna array may be divided into a near field (which may be further divided into a reactive near field and a radiating near field) and a far field. The distance from the antenna array that partitions the near field and the far field may depend on the antenna panel size (D) and the wavelength (λ). Closest to the antenna array may be the reactive near field, which may be associated with distances from 0 to $0.62\sqrt{D^3/\lambda}$. Further than the reactive near field from the antenna array may be the radiating near field, which may be associated with distances from $0.62\sqrt{D^3/\lambda}$ to $2D^2/\lambda$. Furthest from the antenna array may be the far field, which may be associated with distances from $2D^2/\lambda$ to infinity (∞). In practice, a 3D beam may be generated by a large array antenna panel, so that a sufficiently large near field area may be created. A UE may obtain a high data rate via a 3D beam in this near field area. In the far field, the beams generated by the antenna array may be 2D beams.

In a non-limiting example, the carrier frequency $f_c$ may be 30 GHZ (i.e., λ may be 1 cm). The uniform planar array (UPA) antenna array may include 200×200=40,000 antenna elements. The inter-antenna distance d may be λ/2. The aperture size may be 1 m by 1 m.

2D beams may be used to provide SSB coverage. Beams with discrete Fourier transform (DFT) weights may be used to cover a certain direction. With a small antenna array (e.g., an 8×8 array), the beam width of the DFT beam may be large (e.g., 17 degrees), and consequently a small number of beams may be used. However, with a large antenna array (e.g., a 200×200 array), the beam width of the DFT beam may be small (e.g., 0.8 degree), and consequently a large number of beams may be used. To reduce the number of beams, the 2D wide beams (e.g., n-fold wider than DFT beams) (e.g., 2-, 4-, or 8-fold wider than the DFT beam) may be utilized. The 2D wide beams may work well with a small antenna array (e.g., an 8×8 array). However, with a large antenna array (e.g., a 200×200 array), low-signal-strength areas or holes may exist within the beam coverage in the near field.

In one aspect, the base station may transmit the SSBs via both 2D beams and 3D beams. In particular, 2D beams may be used to provide the basic SSB coverage including coverage in the near field and the far field. 3D beams may be used to cover the SSB low-signal-strength holes in the near field.

Figure 7A:
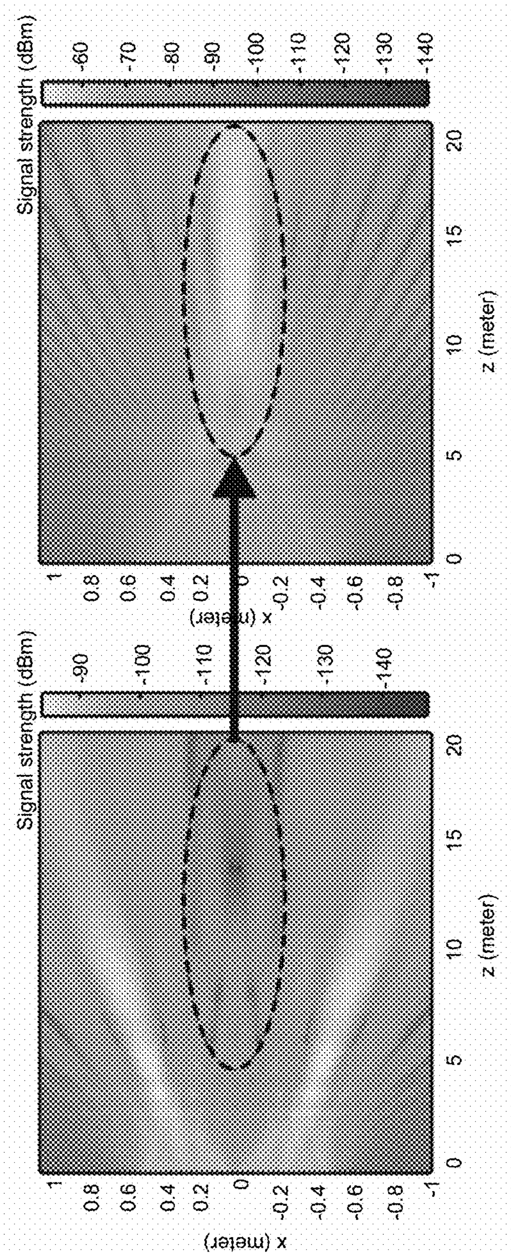
FIGS. 7A and 7B are diagrams illustrating signal strength distributions associated with SSB coverage via at least one 2D beam and one or more 3D beams.
Figure 7B:
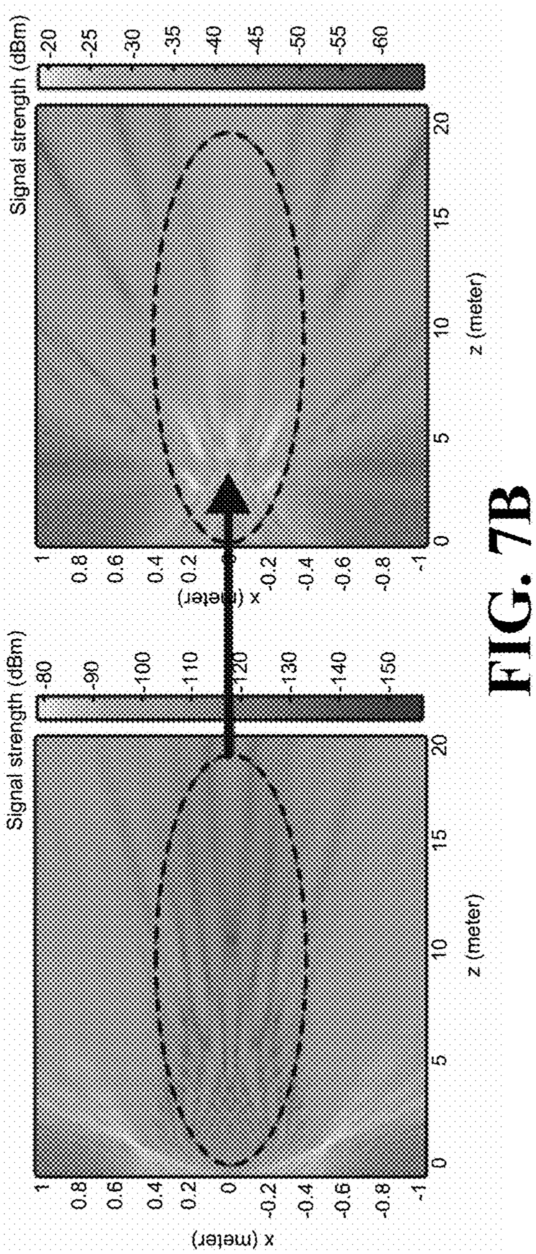

FIGS. 7A and 7B are diagrams 700A and 700B illustrating signal strength distributions associated with SSB coverage via at least one 2D beam and one or more 3D beams. The chart on the left illustrates the signal strength distribution associated with basic SSB coverage via a 2D wide beam. The basic SSB coverage may include one or more SSB low-signal-strength holes. The chart on the right illustrates the signal strength distribution associated enhanced SSB coverage via one or more 3D beams targeted at low-signal-strength holes. FIG. 7A illustrates the signal strength distribution associated with basic SSB coverage via a 2D beam (4-fold wider than the DFT beam) that is targeted at (x=0, y=0) degree. An SSB low-signal-strength hole may be present (e.g., at the (x=0, y=0, z=14) position). FIG. 7A further illustrates the signal strength distribution associated with enhanced SSB coverage via an additional 3D beam targeted at the low-signal-strength hole (e.g., at the (x=0, y=0, 2=14) position). FIG. 7B illustrates the signal strength distribution associated with basic SSB coverage via a 2D beam (8-fold wider than the DFT beam) that is targeted at (x=0, y=0) degree. A number of SSB low-signal-strength holes may be present. FIG. 7B further illustrates the signal strength distribution associated with enhanced SSB coverage via seven additional 3D beams targeted at the low-signal-strength holes. Accordingly, satisfactory SSB coverage may be achieved.

In one aspect, an SSB beam type may be indicated by the base station to a UE. The SSB beam type may include a 2D beam or a 3D beam. Because the SSB is the first signaling message for the UE to receive in the initial access procedure, the indication of the SSB beam type may not be via an explicit message. Rather, the SSB beam type may be indicated implicitly.

In one configuration, the 2D beam SSB and the 3D beam SSB may use different frequency resources. In a non-limiting example, the base station may transmit a 2D beam SSB at a frequency selected from a first frequency set (e.g., the first frequency set may include frequencies with odd frequency values), and may transmit a 3D beam SSB at a frequency selected from a second frequency set (e.g., the second frequency set may include frequencies with even frequency values). Accordingly, for example, when the UE receives an SSB at a frequency in the first frequency set, the UE may identify the beam type of the beam via which the SSB is received as a 2D beam. On the other hand, when the UE receives an SSB at a frequency in the second frequency set, the UE may identify the beam type of the beam via which the SSB is received as a 3D beam.

In one configuration, the 2D beam SSB and the 3D beam SSB may use different PSS or SSS sequences. In a non-limiting example, the PSS or SSS in a 2D beam SSB may be associated with a sequence selected from the first sequence set, and the PSS or SSS in a 3D beam SSB may be associated with a sequence selected from the second sequence set. Accordingly, for example, when the UE receives an SSB including a PSS or SSS sequence in the first sequence set, the UE may identify the beam type of the beam via which the SSB is received as a 2D beam. On the other hand, when the UE receives an SSB including a PSS or SSS sequence in the second sequence set, the UE may identify the beam type of the beam via which the SSB is received as a 3D beam. By using mixed 2D and 3D SSB beams and implicit indication of the beam type for SSB beams, satisfactory SSB coverage for the near field may be realized, and the beam determination latency and the UE power consumption in the initial access procedure may be reduced.

With a large antenna array panel, more SSB beams may be utilized to cover the near field. This may mean either a greater number of 2D beams and/or a greater number of 3D beams. In one aspect, the greater number of SSB beams may be transmitted with time division multiplexing (TDM) or spatial division multiplexing (SDM).

Figure 8:
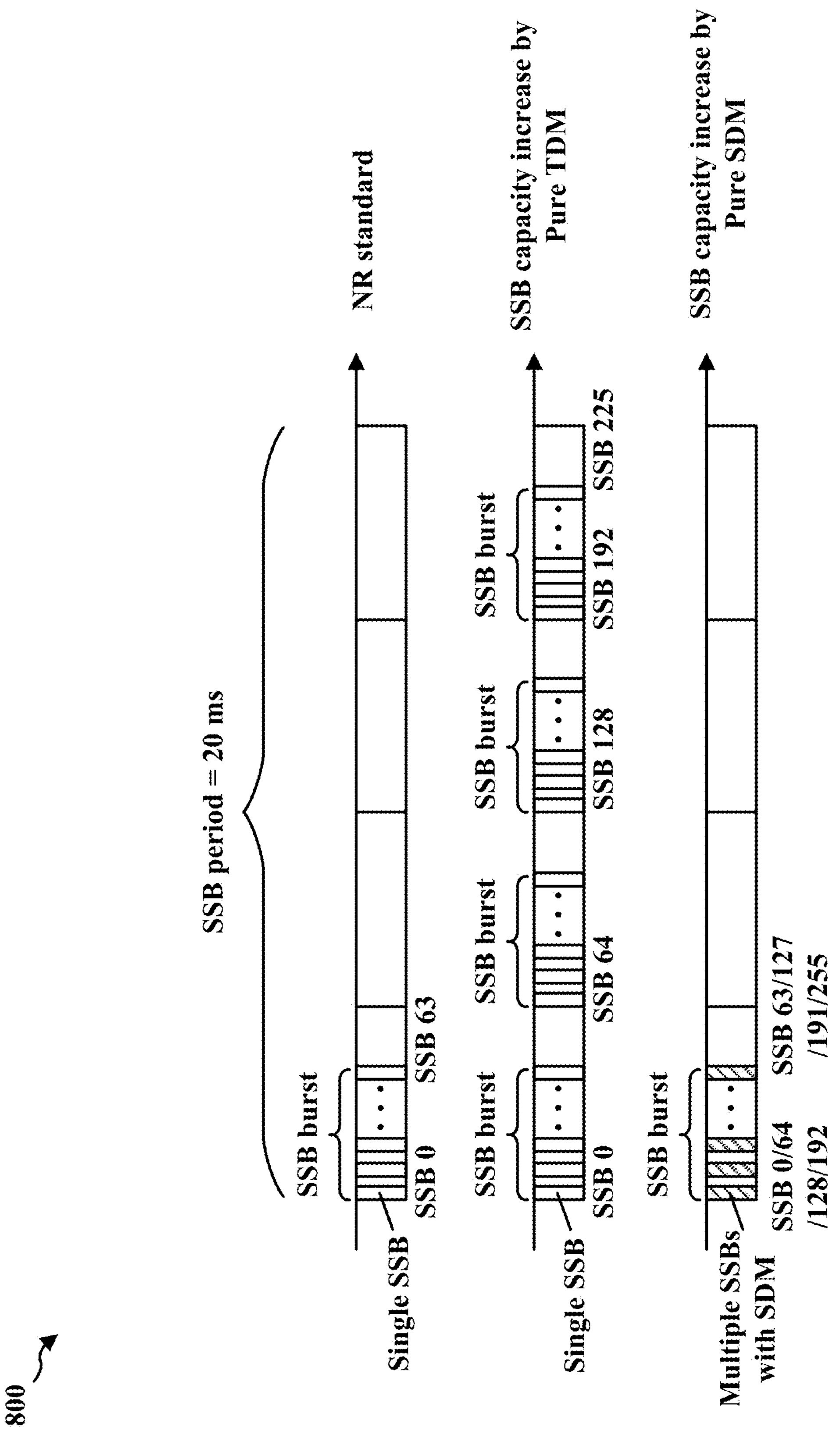
FIG. 8 is a diagram illustrating transmission of an increased number of SSB beams.

FIG. 8 is a diagram 800 illustrating transmission of an increased number of SSB beams. FIG. 8 illustrates a non-limiting example. An SSB period with a duration of 20 ms may be further divided into four SSB sub-periods. In one configuration, 64 SSB beams may be transmitted in an SSB burst within the first SSB sub-period. In one configuration, 256 SSB beams may be transmitted with TDM. The 256 SSB beams may be grouped into four SSB bursts, where each SSB burst may include 64 SSB beams. Each of the four SSB bursts may be transmitted in one of the four SSB sub-periods. The UE may identify the SSB index based on the demodulation reference signal (DMRS) sequence index and the information from the MIB. Transmitting the SSB beams with TDM may be associated with a higher radio resource consumption. In one configuration, 256 SSB beams may be transmitted with SDM. The 256 SSB beams may be transmitted in one SSB burst in the first SSB sub-period, where each time a transmission takes place, four SSB beams are transmitted at once via four different spatial beams. The beams may not be overlapping. The UE may identify the SSB index based on the DMRS sequence index and the information from the MIB. Transmitting the SSB beams with SDM may be associated with a lower radio resource consumption. However, because each beam is transmitted at one fourth of the total transmit power, the signal power associated with the PBCH in each of the beams may be weak. A weak PBCH signal strength may result in a failure to decode the MIB.

Figure 9:
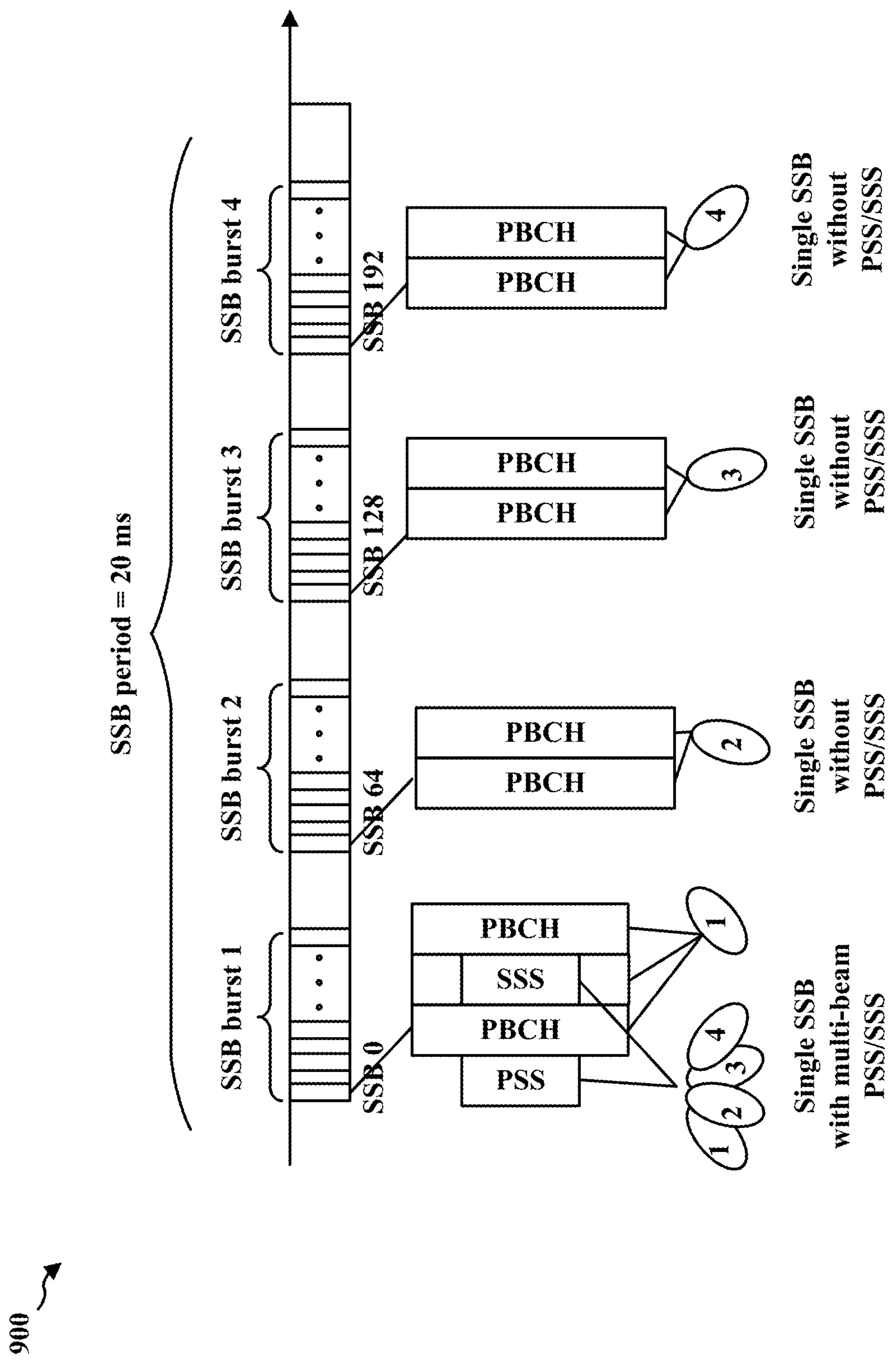
FIG. 9 is a diagram illustrating transmission of an increased number of SSB beams with both TDM and SDM.

In one aspect, the base station may transmit the increased number of SSB beams with both TDM and SDM. FIG. 9 is a diagram 900 illustrating transmission of an increased number of SSB beams with both TDM and SDM. FIG. 9 illustrates a non-limiting example. A PSS or SSS may survive a lower signal-to-interference-plus-noise ratio (SINR) than a PBCH. Accordingly, multiple PBCHs may be transmitted with TDM (e.g., via one beam in SSB bursts 1 through 4), and multiple PSSs or SSSs may be transmitted with SDM (e.g., via multiple spatial beams in SSB burst 1). Because the PBCHs may be transmitted via one beam at each PBCH transmission, the PBCH may be transmitted with the full transmit power. The UE may identify the SSB it has received based at least in part on the interval between the PSS or SSS and the PBCH. For example, a UE covered by spatial beam 1 may receive the PSS or SSS and the PBCH in the same SSB burst (i.e., SSB burst 1). A UE covered by spatial beam 2 may receive the PBCH in the first SSB burst (i.e., SSB burst 2) after the SSB burst (SSB burst 1) in which the UE received the PSS or SSS, and so on. Therefore, the SSB index may be at least partially based on the PSS-to-PBCH interval. Of course, the SSB index may be based further on the DMRS sequence index and the information from the MIB. In one example, two bits (e.g., the two highest bits) in the SSB index may be based on the PSS-to-PBCH interval. The two bits may be ‘00’ when the PBCH is in the same SSB burst as the PSS or SSS, may be ‘01’ when the PBCH is in the first SSB burst after the PSS or SSS, may be ‘10’ when the PBCH is in the second SSB burst after the PSS or SSS, and may be ‘11’ when the PBCH is in the third SSB burst after the PSS or SSS.

The UE may search multiple time domain positions in an attempt to receive the PBCH after detecting the PSS or SSS. For example, a UE may be located in the coverage area of spatial beam 3. After the UE successfully decodes the PSS or SSS with a particular receive beam in SSB burst 1, the UE may attempt to receive and decode the PBCH with the same receive beam in the four SSB bursts 1 through 4. When the UE successfully decodes the PBCH in SSB burst 3, the UE may obtain the corresponding SSB index fraction (e.g., the two highest bit)='10' based on the PSS-to-PBCH interval (the PBCH is in the second SSB burst after the PSS or SSS). Transmitting the increased number of SSB beams with both TDM and SDM, as described above, may be associated with a lower radio resource consumption for the PSS or SSS than with TDM alone and a stronger signal power for the PBCH than with SDM alone.

In one configuration, the base station may inform a connected UE via SIB 1 (SIB1) (compressed indication) or dedicated RRC signaling (full indication) about the presence of each SSB. A 64-bit bitmap may be used for the indication. Up to 64 SSBs may be supported, where each bit in the bitmap may correspond to one of the SSBs.

In further configurations, more than 64 SSBs may be supported. In one configuration, a full bitmap with more than 64 bits may be used by the base station to indicate the presence of each SSB. Each bit in the full bitmap may correspond to one of the SSB positions. Accordingly, the status of all SSB positions may be indicated with the full bitmap, where more than 64 SSB positions are present.

In one configuration, the 64-bit bitmap may be retained for the basic SSB positions. The basic SSB positions may also be referred to as first SSB positions. If an SSB at a basic SSB position is transmitted, the corresponding bit in the bitmap may be set (e.g., the value may be set to 1). Further, N extra bits corresponding to all the N derived (new) SSB positions corresponding to that basic position may be used, where N may be a natural number. For example, derived SSB positions may refer to, e.g., the three (i.e., N=3) additional SSB positions as shown in FIG. 9. The derived SSB positions may also be referred to as second SSB positions. At each SSB position, either a full SSB is transmitted, or a PBCH is transmitted without the PSS or SSS. If an SSB at a basic SSB position is not transmitted, the corresponding bit in the bitmap may not be set (e.g., the value may be set to 0). Then it may also be inferred that the corresponding derived SSBs are not transmitted either. This approach may be associated with bit savings at the cost of being less flexible than the full bitmap.

In one configuration, the same 64-bit bitmap may be used. No additional bits may be used for the derived SSB positions. Each bit in the bitmap may correspond to one set of SSB positions: a basic SSB position and the corresponding derived SSB positions. This approach may be associated with still more bit savings at the cost of being still less flexible than using the 64-bit bitmap and the N extra bits where applicable.

The base station may transmit the indication of the presence of SSBs including the bitmap to the UE in a dedicated RRC message. For the compressed indication in SIB 1, in one configuration, the SSB positions may be divided into groups. Each group of SSB positions may be associated with a bit pattern that may indicate which SSBs are transmitted. Another bit pattern may indicate which groups of are transmitted. The bit patterns may be transmitted by the base station to the UE via SIB 1. Accordingly, compression may be achieved at the cost of losing flexibility, as all groups may be limited to being associated with the same pattern. In one configuration, within each group, similar extensions to those described above including extra bits may be used to indicate the status of the derived SSB positions. Accordingly, the base station may transmit the indication of the presence or absence of an increased number of SSBs to connected UEs. A tradeoff between flexibility and signaling overhead may be considered in selecting the format of the indication.

Figure 10:
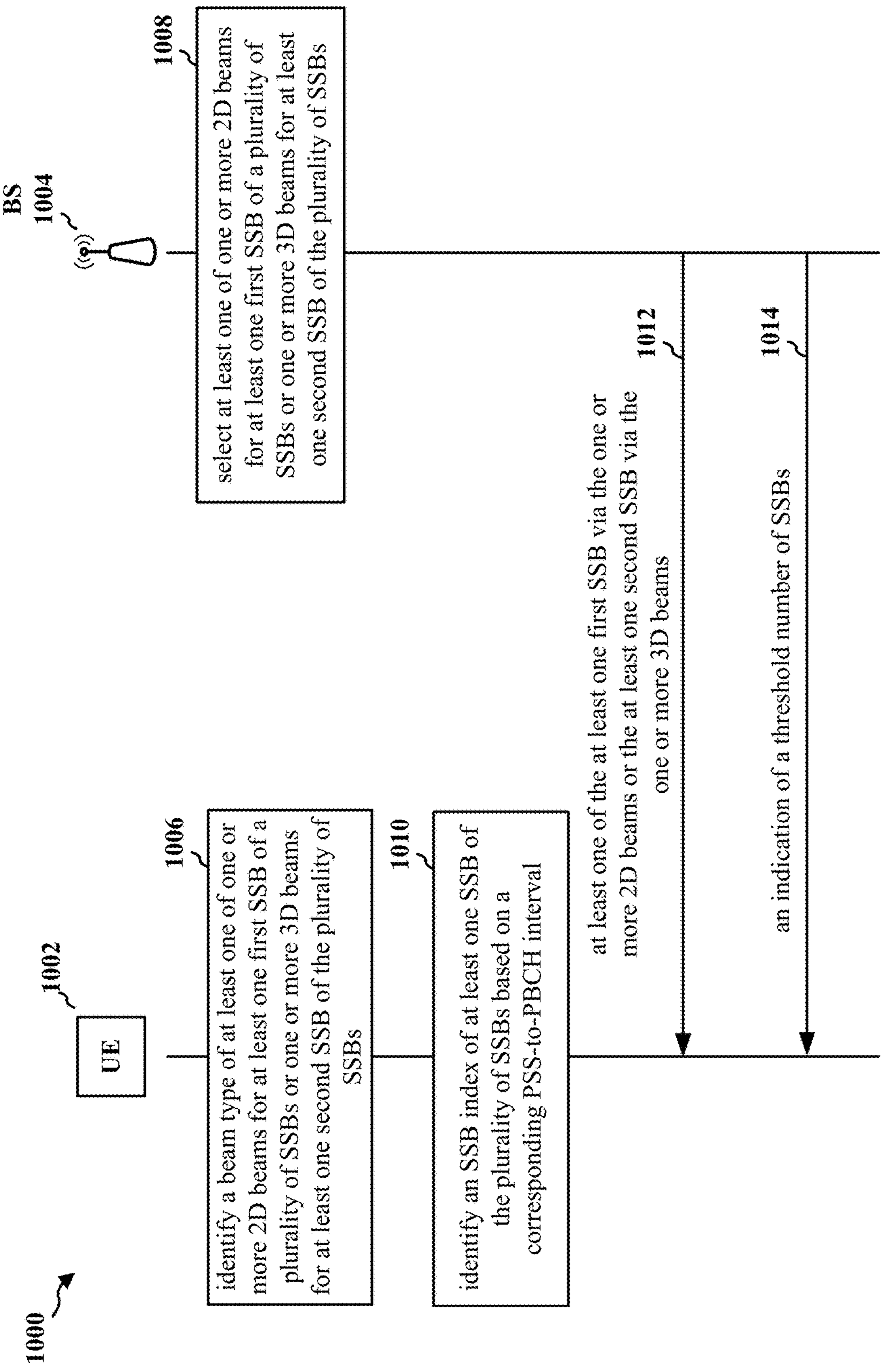
FIG. 10 is a diagram illustrating a communication flow of a method of wireless communication.

FIG. 10 is a diagram 1000 illustrating a communication flow of a method of wireless communication. The UE 1002 may correspond to the UE 104/350. The base station 1004 may correspond to the base station 102/180/310. At 1008, the base station 1004 may select at least one of one or more 2D beams for at least one first SSB of a plurality of SSBs or one or more 3D beams for at least one second SSB of the plurality of SSBs. At 1006, the UE 1002 may identify a beam type of at least one of one or more 2D beams for at least one first SSB of a plurality of SSBs or one or more 3D beams for at least one second SSB of the plurality of SSBs. At 1010, the UE 1002 may identify an SSB index of at least one SSB of the plurality of SSBs based on a corresponding PSS-to-PBCH interval. At 1012, the base station 1004 may transmit, to the UE 1002, and the UE 1002 may receive, from the base station 1004, at least one of the at least one first SSB via the one or more 2D beams or the at least one second SSB via the one or more 3D beams. A beam type of the at least one of the one or more 2D beams or the one or more 3D beams may be associated with at least one of one or more frequency resources or one or more PSS or SSS sequences. At 1014, the base station 1004 may transmit, to the UE 1002, and the UE 1002 may receive, from the base station 1004, an indication of a threshold number of SSBs. The threshold number of SSBs may include more than 64 SSBs.

Figure 11:
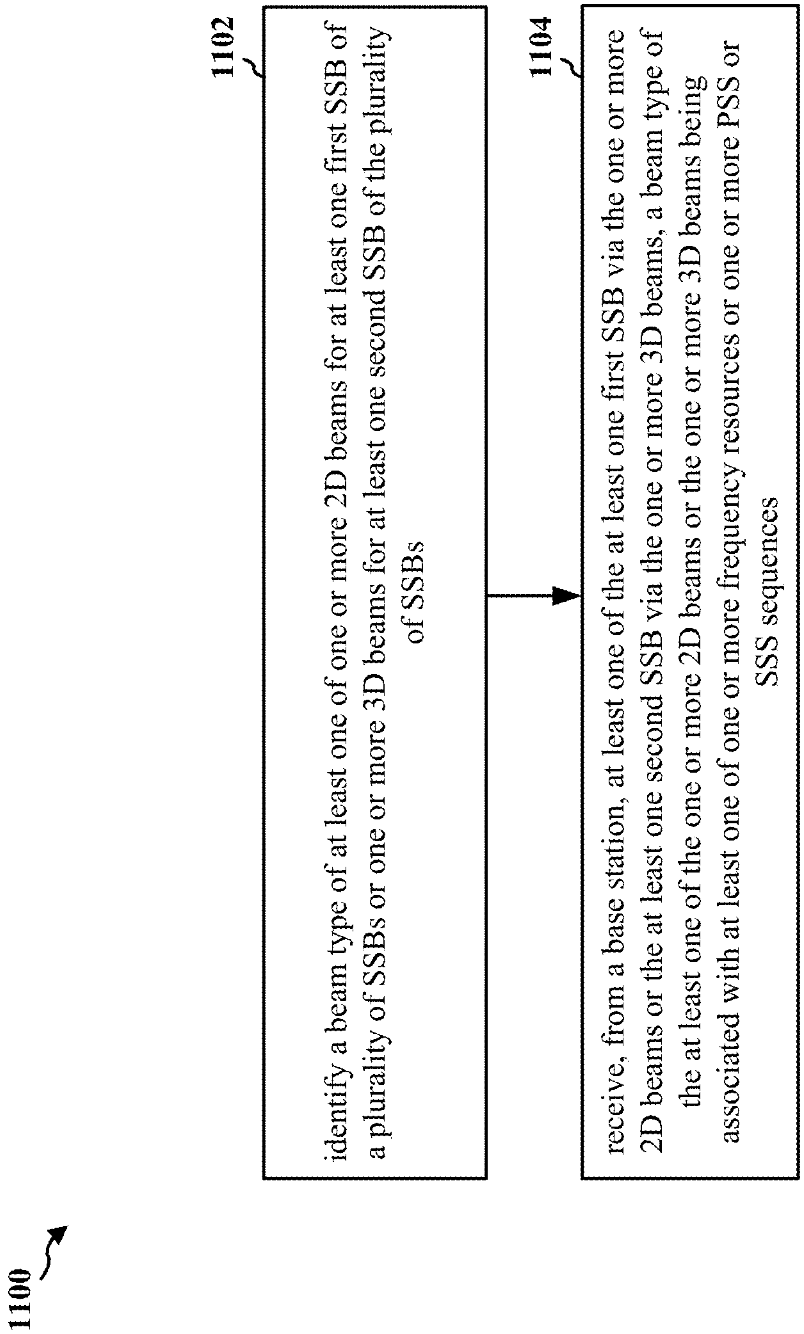
FIG. 11 is a flowchart of a method of wireless communication.

FIG. 11 is a flowchart 1100 of a method of wireless communication. The method may be performed by a UE (e.g., the UE 104/350/1002; the apparatus 1502). At 1102, the UE may identify a beam type of at least one of one or more 2D beams for at least one first SSB of a plurality of SSBs or one or more 3D beams for at least one second SSB of the plurality of SSBs. For example, 1102 may be performed by the SSB component 1540 in FIG. 15. Referring to FIG. 10, at 1006, the UE 1002 may identify a beam type of at least one of one or more 2D beams for at least one first SSB of a plurality of SSBs or one or more 3D beams for at least one second SSB of the plurality of SSBs.

At 1104, the UE may receive, from a base station, at least one of the at least one first SSB via the one or more 2D beams or the at least one second SSB via the one or more 3D beams. A beam type of the at least one of the one or more 2D beams or the one or more 3D beams may be associated with at least one of one or more frequency resources or one or more PSS or SSS sequences. For example, 1104 may be performed by the SSB component 1540 in FIG. 15. Referring to FIG. 10, at 1012, the UE 1002 may receive, from a base station 1004, at least one of the at least one first SSB via the one or more 2D beams or the at least one second SSB via the one or more 3D beams.

Figure 12:
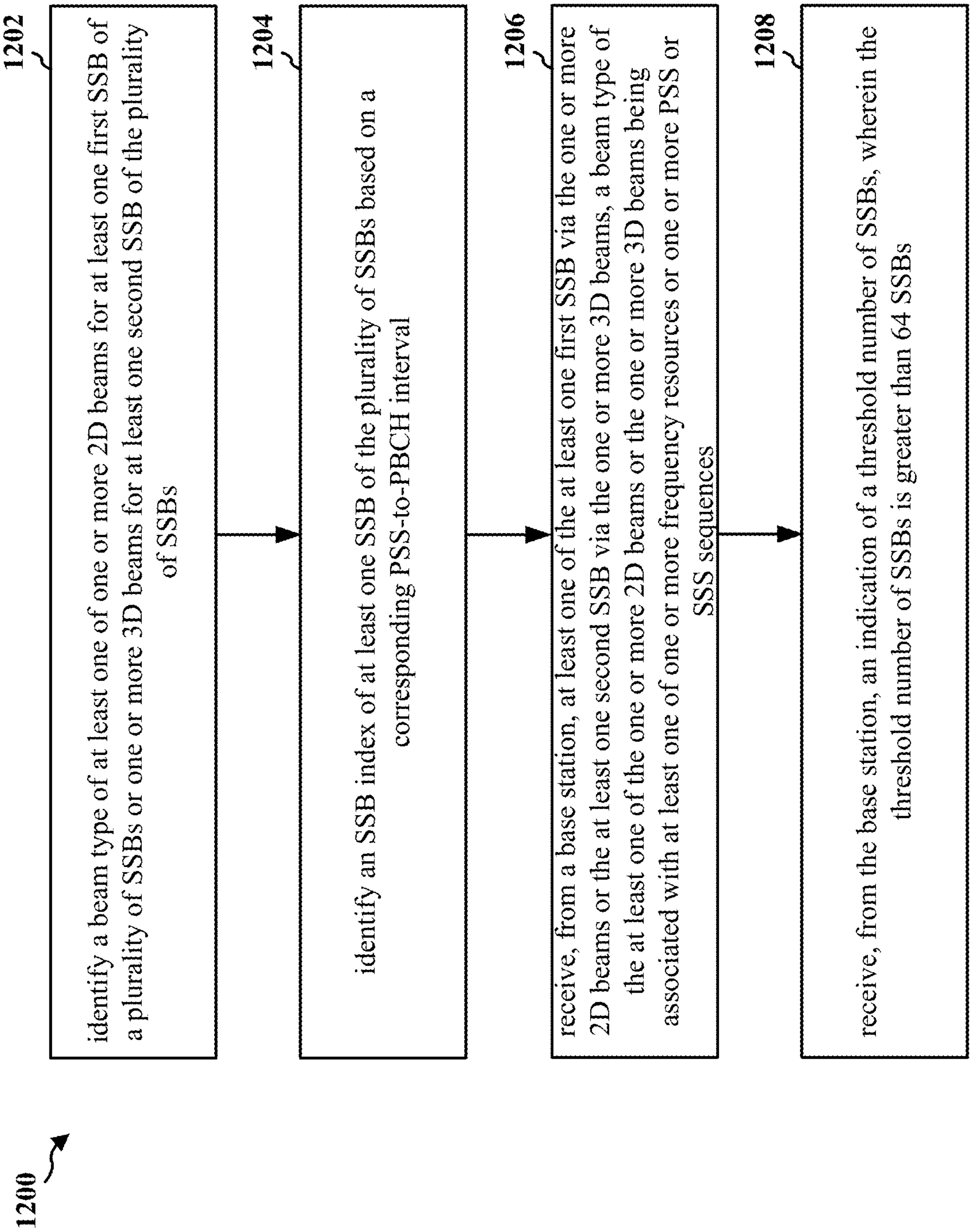
FIG. 12 is a flowchart of a method of wireless communication.

FIG. 12 is a flowchart 1200 of a method of wireless communication. The method may be performed by a UE (e.g., the UE 104/350/1002; the apparatus 1502). At 1202, the UE may identify a beam type of at least one of one or more 2D beams for at least one first SSB of a plurality of SSBs or one or more 3D beams for at least one second SSB of the plurality of SSBs. For example, 1202 may be performed by the SSB component 1540 in FIG. 15. Referring to FIG. 10, at 1006, the UE 1002 may identify a beam type of at least one of one or more 2D beams for at least one first SSB of a plurality of SSBs or one or more 3D beams for at least one second SSB of the plurality of SSBs.

At 1206, the UE may receive, from a base station, at least one of the at least one first SSB via the one or more 2D beams or the at least one second SSB via the one or more 3D beams. A beam type of the at least one of the one or more 2D beams or the one or more 3D beams may be associated with at least one of one or more frequency resources or one or more PSS or SSS sequences. For example, 1206 may be performed by the SSB component 1540 in FIG. 15. Referring to FIG. 10, at 1012, the UE 1002 may receive, from a base station 1004, at least one of the at least one first SSB via the one or more 2D beams or the at least one second SSB via the one or more 3D beams.

In one configuration, the one or more 2D beams may be associated with SSB coverage including a near field and a far field. The one or more 3D beams may be associated with one or more SSB low-signal-strength holes in the near field.

In one configuration, the one or more frequency resources or the one or more PSS or SSS sequences associated with the beam type may be preconfigured or predetermined.

In one configuration, the at least one first SSB may be associated with a first frequency resource set. The at least one second SSB may be associated with a second frequency resource set different from the first frequency resource set.

In one configuration, the at least one first SSB may be associated with a first PSS or SSS sequence set. The at least one second SSB may be associated with a second PSS or SSS sequence set different form the first PSS or SSS sequence set.

In one configuration, a plurality of PBCHs of the plurality of SSBs may be associated with TDM. A plurality of PSS or SSS sequences of the plurality of SSBs may be associated with SDM.

In one configuration, at 1204, the UE may identify an SSB index of at least one SSB of the plurality of SSBs based on a corresponding PSS-to-PBCH interval. For example, 1204 may be performed by the SSB component 1540 in FIG. 15. Referring to FIG. 10, at 1010, the UE 1002 may identify an SSB index of at least one SSB of the plurality of SSBs based on a corresponding PSS-to-PBCH interval.

In one configuration, at 1208, the UE may receive, from the base station, an indication of a threshold number of SSBs. The threshold number of SSBs may include more than 64 SSBs. For example, 1208 may be performed by the SSB component 1540 in FIG. 15. Referring to FIG. 10, at 1014, the UE 1002 may receive, from the base station 1004, an indication of a threshold number of SSBs.

In one configuration, the indication of the threshold number of SSBs may include a bitmap including a first number of bits corresponding to a first number of SSB positions. The first number may be greater than or equal to the threshold number. Each bit of the first number of bits in the bitmap may correspond to one respective SSB position of the first number of SSB positions. Each SSB of the threshold number of SSBs may correspond to one SSB position of the first number of SSB positions.

In one configuration, the indication of the threshold number of SSBs may include a first bitmap including a second number of bits (e.g., 64 bits) corresponding to a second number of first SSB positions (e.g., 64 first SSB positions) and one or more second bitmaps each including one or more bits corresponding to a corresponding set of second SSB positions of one or more second SSB positions. Each bit of the second number of bits in the first bitmap may correspond to one respective first SSB position. Each bit of the one or more bits in each second bitmap of the one or more second bitmaps may correspond to one respective second SSB position in the corresponding set of second SSB positions. Each second bitmap of the one or more second bitmaps may correspond to one set bit in the first bitmap. Each SSB of the threshold number of SSBs may correspond to one first SSB position of the second number of first SSB positions or one second SSB position of the one or more second SSB positions.

In one configuration, the indication of the threshold number of SSBs may be received via an RRC message.

Figure 13:
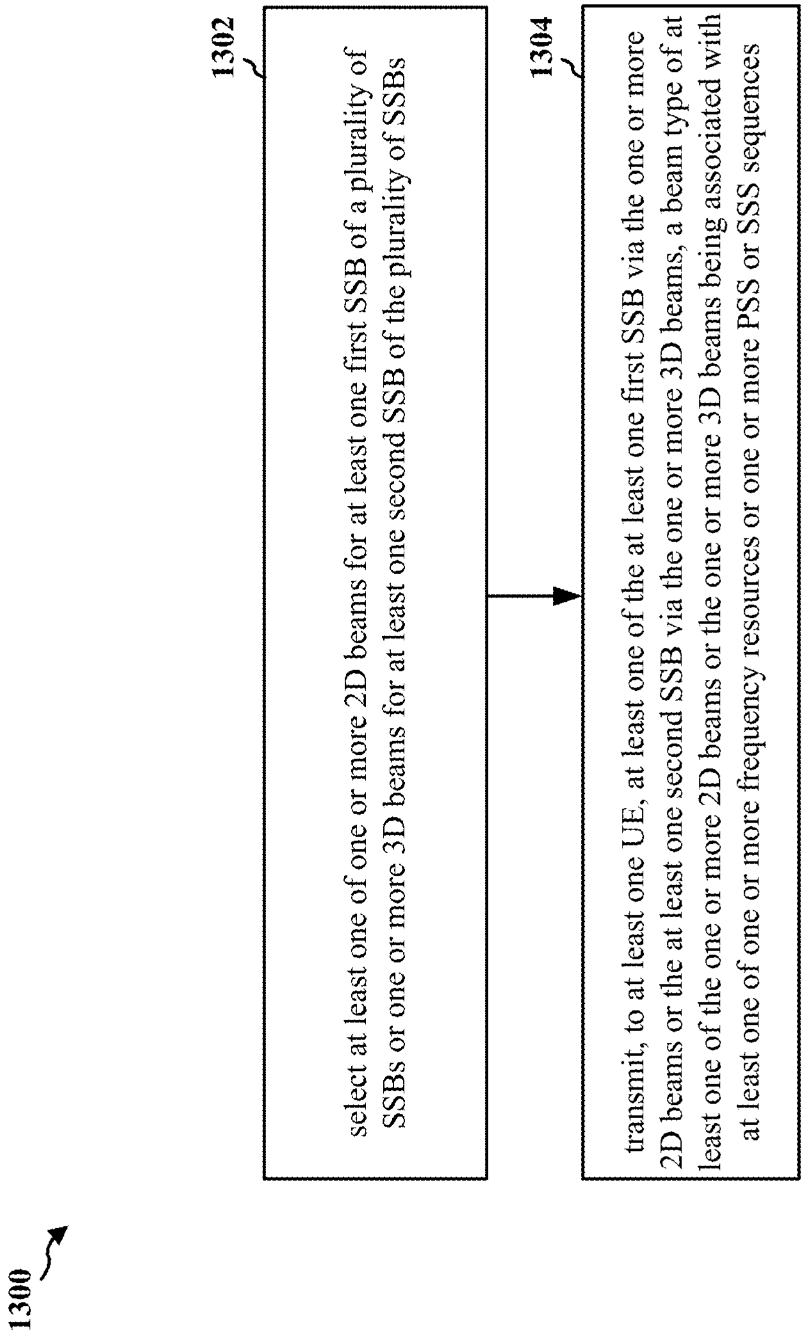
FIG. 13 is a flowchart of a method of wireless communication.

FIG. 13 is a flowchart 1300 of a method of wireless communication. The method may be performed by a base station (e.g., the base station 102/180/310/1004; the apparatus 1602). At 1302, the base station may select at least one of one or more 2D beams for at least one first SSB of a plurality of SSBs or one or more 3D beams for at least one second SSB of the plurality of SSBs. For example, 1302 may be performed by 1640 in FIG. 16. Referring to FIG. 10, at 1008, the base station 1004 may select at least one of one or more 2D beams for at least one first SSB of a plurality of SSBs or one or more 3D beams for at least one second SSB of the plurality of SSBs.

At 1304, the base station may transmit, to at least one UE, at least one of the at least one first SSB via the one or more 2D beams or the at least one second SSB via the one or more 3D beams. A beam type of at least one of the one or more 2D beams or the one or more 3D beams may be associated with at least one of one or more frequency resources or one or more PSS or SSS sequences. For example, 1304 may be performed by 1640 in FIG. 16. Referring to FIG. 10, at 1012, the base station 1004 may transmit, to at least one UE 1002, at least one of the at least one first SSB via the one or more 2D beams or the at least one second SSB via the one or more 3D beams.

Figure 14:
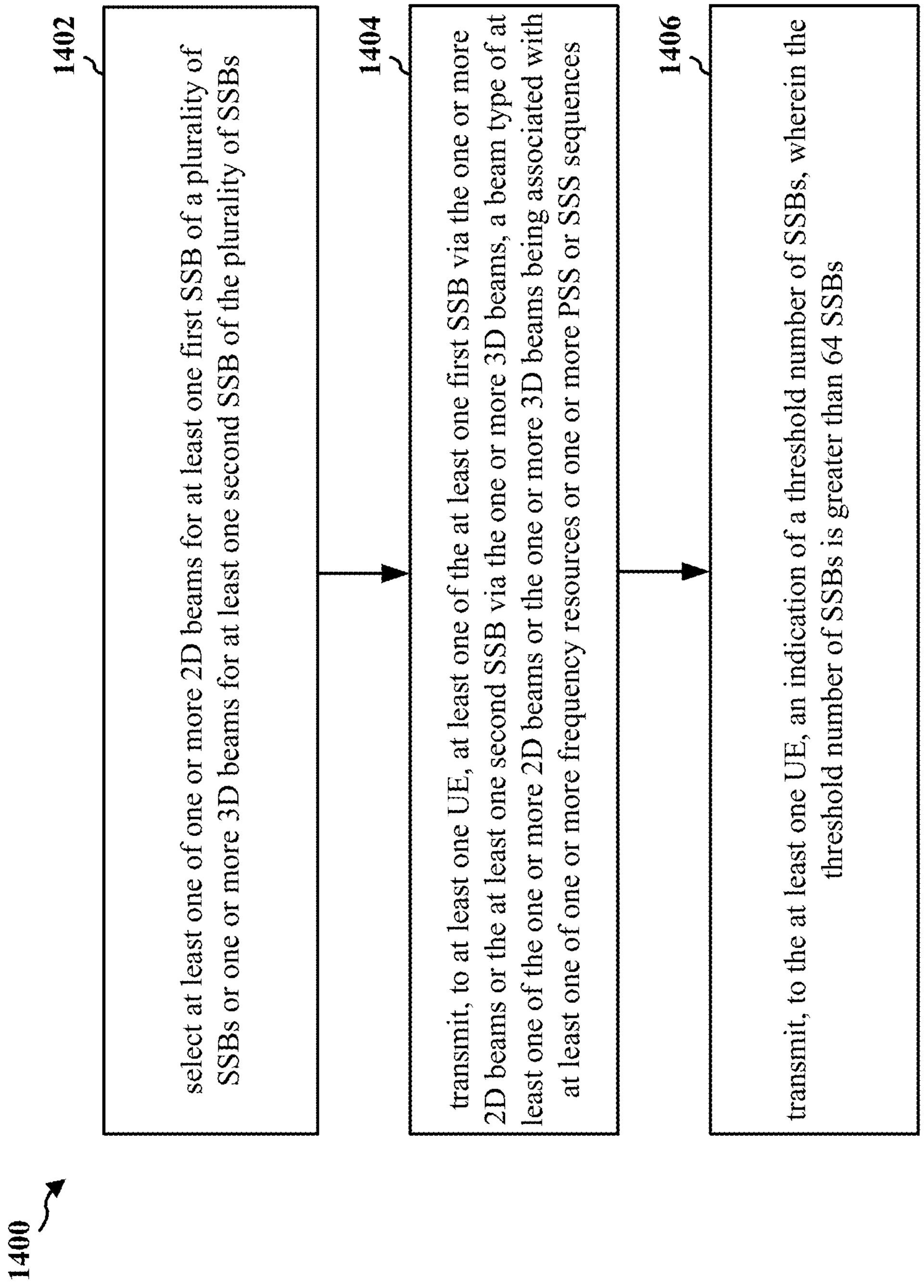
FIG. 14 is a flowchart of a method of wireless communication.

FIG. 14 is a flowchart 1400 of a method of wireless communication. The method may be performed by a base station (e.g., the base station 102/180/310/1004; the apparatus 1602). At 1402, the base station may select at least one of one or more 2D beams for at least one first SSB of a plurality of SSBs or one or more 3D beams for at least one second SSB of the plurality of SSBs. For example, 1402 may be performed by 1640 in FIG. 16. Referring to FIG. 10, at 1008, the base station 1004 may select at least one of one or more 2D beams for at least one first SSB of a plurality of SSBs or one or more 3D beams for at least one second SSB of the plurality of SSBs.

At 1404, the base station may transmit, to at least one UE, at least one of the at least one first SSB via the one or more 2D beams or the at least one second SSB via the one or more 3D beams. A beam type of at least one of the one or more 2D beams or the one or more 3D beams may be associated with at least one of one or more frequency resources or one or more PSS or SSS sequences. For example, 1404 may be performed by 1640 in FIG. 16. Referring to FIG. 10, at 1012, the base station 1004 may transmit, to at least one UE 1002, at least one of the at least one first SSB via the one or more 2D beams or the at least one second SSB via the one or more 3D beams. In one configuration, the one or more 2D beams may be associated with SSB coverage including a near field and a far field. The one or more 3D beams may be associated with one or more SSB low-signal-strength holes in the near field.

In one configuration, the one or more frequency resources or the one or more PSS or SSS sequences associated with the beam type may be preconfigured or predetermined.

In one configuration, the at least one first SSB may be associated with a first frequency resource set. The at least one second SSB may be associated with a second frequency resource set different from the first frequency resource set.

In one configuration, the at least one first SSB may be associated with a first PSS or SSS sequence set. The at least one second SSB may be associated with a second PSS or SSS sequence set different form the first PSS or SSS sequence set.

In one configuration, a plurality of PBCHs of the plurality of SSBs may be associated with TDM. A plurality of PSS or SSS sequences of the plurality of SSBs may be associated with SDM.

In one configuration, an SSB index of at least one SSB of the plurality of SSBs may be based on a corresponding PSS-to-PBCH interval.

In one configuration, at 1406, the base station may transmit, to the at least one UE, an indication of a threshold number of SSBs. The threshold number of SSBs may include more than 64 SSBs. For example, 1406 may be performed by 1640 in FIG. 16. Referring to FIG. 10, at 1014, the base station 1004 may transmit, to the at least one UE 1002, an indication of a threshold number of SSBs.

In one configuration, the indication of the threshold number of SSBs may include a bitmap including a first number of bits corresponding to a first number of SSB positions. The first number may be greater than or equal to the threshold number. Each bit of the first number of bits in the bitmap may correspond to one respective SSB position of the first number of SSB positions. Each SSB of the threshold number of SSBs may correspond to one SSB position of the first number of SSB positions whose corresponding bits in the first bitmap are set.

In one configuration, the indication of the threshold number of SSBs may include a first bitmap including a second number of bits (e.g., 64 bits) corresponding to a second number of first SSB positions (e.g., 64 first SSB positions) and one or more second bitmaps each including one or more bits corresponding to a corresponding set of second SSB positions of one or more second SSB positions. Each bit of the second number of bits in the first bitmap may correspond to one respective first SSB position. Each second bitmap of the one or more second bitmaps may correspond to one first SSB position of the second number of first SSB positions whose corresponding bits in the first bitmap are set. Each bit of the one or more bits in each second bitmap of the one or more second bitmaps may correspond to one respective second SSB position in the corresponding set of second SSB positions. Each SSB of the threshold number of SSBs may correspond to one first SSB position of the second number of first SSB positions whose corresponding bits in the first bitmap are set or one second SSB position of the one or more second SSB positions whose corresponding bits in the one or more second bitmaps are set.

In one configuration, the indication of the threshold number of SSBs may be transmitted via an RRC message.

Figure 15:
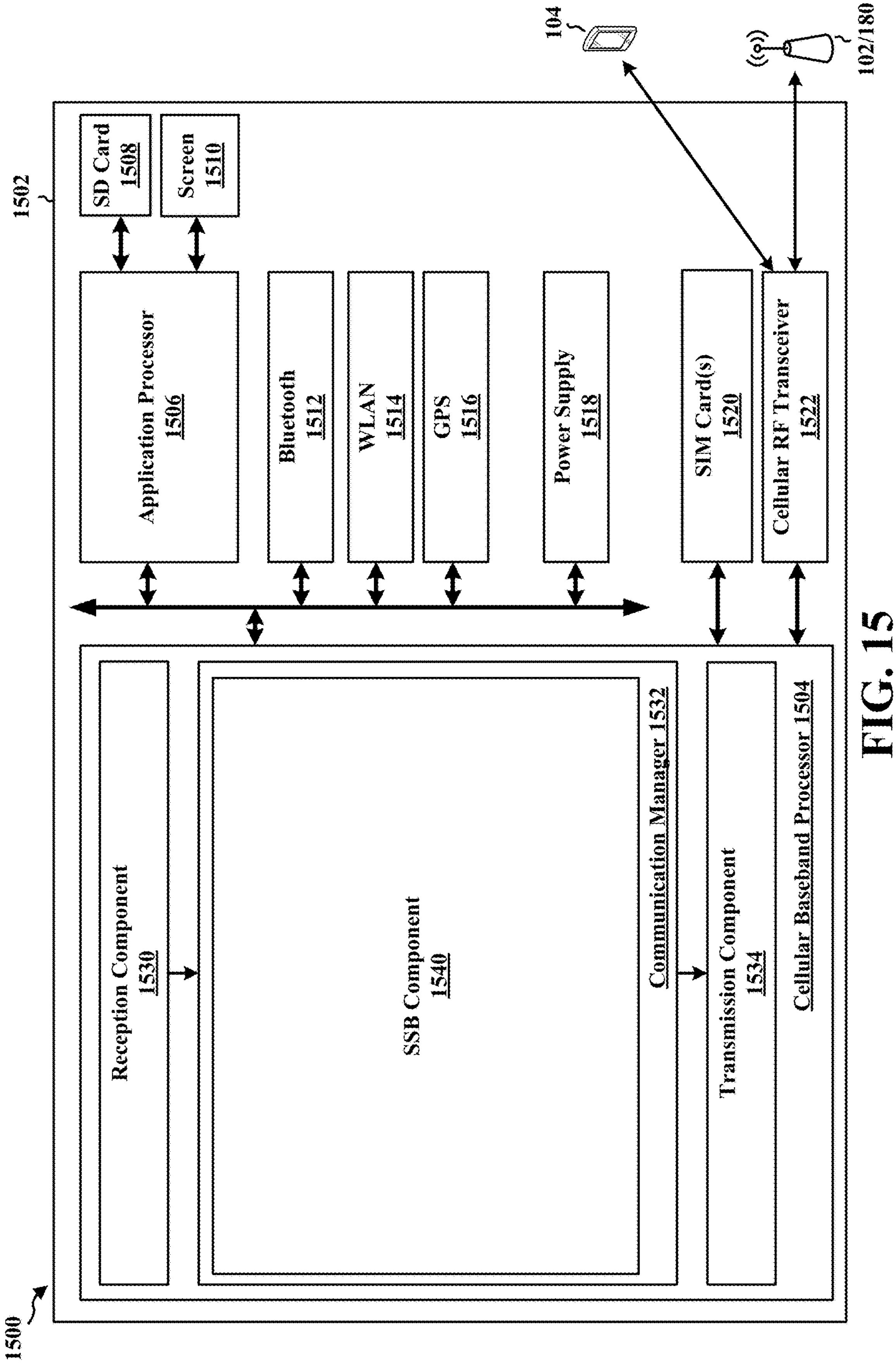
FIG. 15 is a diagram illustrating an example of a hardware implementation for an example apparatus.

FIG. 15 is a diagram 1500 illustrating an example of a hardware implementation for an apparatus 1502. The apparatus 1502 may be a UE, a component of a UE, or may implement UE functionality. In some aspects, the apparatus 1502 may include a cellular baseband processor 1504 (also referred to as a modem) coupled to a cellular RF transceiver 1522. In some aspects, the apparatus 1502 may further include one or more subscriber identity modules (SIM) cards 1520, an application processor 1506 coupled to a secure digital (SD) card 1508 and a screen 1510, a Bluetooth module 1512, a wireless local area network (WLAN) module 1514, a Global Positioning System (GPS) module 1516, or a power supply 1518. The cellular baseband processor 1504 communicates through the cellular RF transceiver 1522 with the UE 104 and/or BS 102/180. The cellular baseband processor 1504 may include a computer-readable medium/memory. The computer-readable medium/memory may be non-transitory. The cellular baseband processor 1504 is responsible for general processing, including the execution of software stored on the computer-readable medium/memory. The software, when executed by the cellular baseband processor 1504, causes the cellular baseband processor 1504 to perform the various functions described supra. The computer-readable medium/memory may also be used for storing data that is manipulated by the cellular baseband processor 1504 when executing software. The cellular baseband processor 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the cellular baseband processor 1504. The cellular baseband processor 1504 may be a component of the UE 350 and may include the memory 360 and/or at least one of the TX processor 368, the RX processor 356, and the controller/processor 359. In one configuration, the apparatus 1502 may be a modem chip and include just the baseband processor 1504, and in another configuration, the apparatus 1502 may be the entire UE (e.g., see 350 of FIG. 3) and include the additional modules of the apparatus 1502.

The communication manager 1532 includes an SSB component 1540 that may be configured to identify a beam type of at least one of one or more 2D beams for at least one first SSB of a plurality of SSBs or one or more 3D beams for at least one second SSB of the plurality of SSBs, e.g., as described in connection with 1102 in FIGS. 11 and 1202 in FIG. 12. The SSB component 1540 may be configured to identify an SSB index of at least one SSB of the plurality of SSBs based on a corresponding PSS-to-PBCH interval, e.g., as described in connection with 1204 in FIG. 12. The SSB component 1540 may be configured to receive, from a base station, at least one of the at least one first SSB via the one or more 2D beams or the at least one second SSB via the one or more 3D beams, e.g., as described in connection with 1104 in FIGS. 11 and 1206 in FIG. 12. The SSB component 1540 may be configured to receive, from the base station, an indication of a threshold number of SSBs, e.g., as described in connection with 1208 in FIG. 12.

The apparatus may include additional components that perform each of the blocks of the algorithm in the flowcharts of FIGS. 10-12. As such, each block in the flowcharts of FIGS. 10-12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1502 may include a variety of components configured for various functions. In one configuration, the apparatus 1502, and in particular the cellular baseband processor 1504, includes means for identifying a beam type of at least one of one or more 2D beams for at least one first SSB of a plurality of SSBs or one or more 3D beams for at least one second SSB of the plurality of SSBs The apparatus 1502 may include means for receiving, from a base station, at least one of the at least one first SSB via the one or more 2D beams or the at least one second SSB via the one or more 3D beams. A beam type of the at least one of the one or more 2D beams or the one or more 3D beams may be associated with at least one of one or more frequency resources or one or more PSS or SSS sequences.

In one configuration, the one or more 2D beams may be associated with SSB coverage including a near field and a far field. The one or more 3D beams may be associated with one or more SSB low-signal-strength holes in the near field. In one configuration, the one or more frequency resources or the one or more PSS or SSS sequences associated with the beam type may be preconfigured or predetermined. In one configuration, the at least one first SSB may be associated with a first frequency resource set. The at least one second SSB may be associated with a second frequency resource set different from the first frequency resource set. In one configuration, the at least one first SSB may be associated with a first PSS or SSS sequence set. The at least one second SSB may be associated with a second PSS or SSS sequence set different form the first PSS or SSS sequence set. In one configuration, a plurality of PBCHs of the plurality of SSBs may be associated with TDM. A plurality of PSS or SSS sequences of the plurality of SSBs may be associated with SDM. In one configuration, the apparatus 1502 may include means for identifying an SSB index of at least one SSB of the plurality of SSBs based on a corresponding PSS-to-PBCH interval. In one configuration, the apparatus 1502 may include means for receiving, from the base station, an indication of a threshold number of SSBs. The threshold number of SSBs may include more than 64 SSBs. In one configuration, the indication of the threshold number of SSBs may include a bitmap including a first number of bits corresponding to a first number of SSB positions. The first number may be greater than or equal to the threshold number. Each bit of the first number of bits in the bitmap may correspond to one respective SSB position of the first number of SSB positions. Each SSB of the threshold number of SSBs may correspond to one SSB position of the first number of SSB positions. In one configuration, the indication of the threshold number of SSBs may include a first bitmap including a second number of bits corresponding to a second number of first SSB positions and one or more second bitmaps each including one or more bits corresponding to a corresponding set of second SSB positions of one or more second SSB positions. Each bit of the second number of bits in the first bitmap may correspond to one respective first SSB position. Each bit of the one or more bits in each second bitmap of the one or more second bitmaps may correspond to one respective second SSB position in the corresponding set of second SSB positions. Each second bitmap of the one or more second bitmaps may correspond to one set bit in the first bitmap. Each SSB of the threshold number of SSBs may correspond to one first SSB position of the second number of first SSB positions or one second SSB position of the one or more second SSB positions. In one configuration, the indication of the threshold number of SSBs may be received via an RRC message.

The means may be one or more of the components of the apparatus 1502 configured to perform the functions recited by the means. As described supra, the apparatus 1502 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 16:
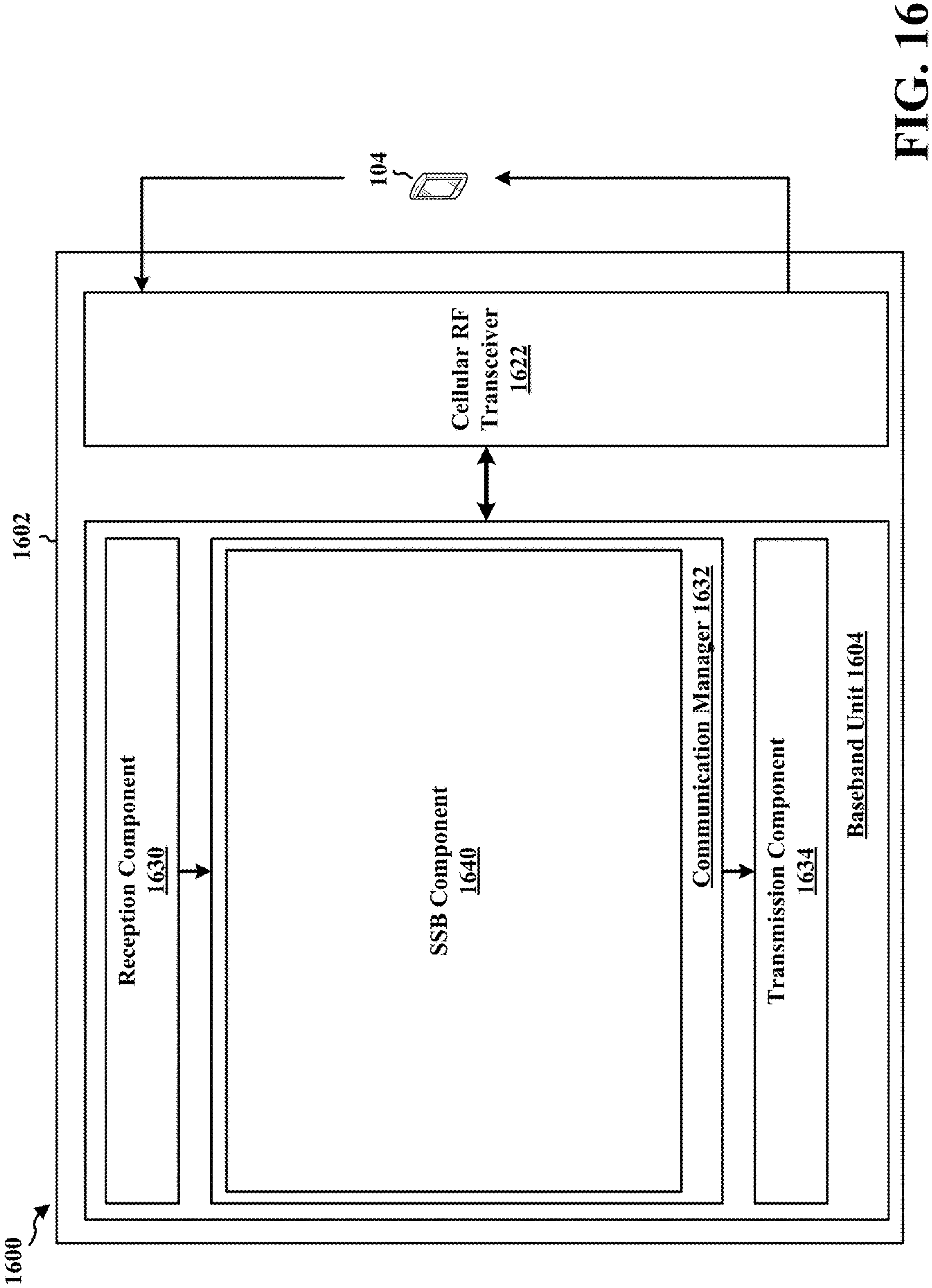
FIG. 16 is a diagram illustrating an example of a hardware implementation for an example apparatus.

FIG. 16 is a diagram 1600 illustrating an example of a hardware implementation for an apparatus 1602. The apparatus 1602 may be a base station, a component of a base station, or may implement base station functionality. In some aspects, the apparatus 1602 may include a baseband unit 1604. The baseband unit 1604 may communicate through a cellular RF transceiver 1622 with the UE 104. The baseband unit 1604 may include a computer-readable medium/memory. The baseband unit 1604 is responsible for general processing, including the execution of software stored on the computer-readable medium/memory. The software, when executed by the baseband unit 1604, causes the baseband unit 1604 to perform the various functions described supra. The computer-readable medium/memory may also be used for storing data that is manipulated by the baseband unit 1604 when executing software. The baseband unit 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the baseband unit 1604. The baseband unit 1604 may be a component of the base station 310 and may include the memory 376 and/or at least one of the TX processor 316, the RX processor 370, and the controller/processor 375.

The communication manager 1632 includes an SSB component 1640 that may be configured to select at least one of one or more 2D beams for at least one first SSB of a plurality of SSBs or one or more 3D beams for at least one second SSB of the plurality of SSBs, e.g., as described in connection with 1302 in FIGS. 13 and 1402 in FIG. 14. The SSB component 1640 may be configured to transmit, to at least one UE, at least one of the at least one first SSB via the one or more 2D beams or the at least one second SSB via the one or more 3D beams, e.g., as described in connection with 1304 in FIGS. 13 and 1404 in FIG. 14. The SSB component 1640 may be configured to transmit, to the at least one UE, an indication of a threshold number of SSBs, e.g., as described in connection with 1406 in FIG. 14.

The apparatus may include additional components that perform each of the blocks of the algorithm in the flowcharts of FIGS. 10, 13, and 14. As such, each block in the flowcharts of FIGS. 10, 13, and 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1602 may include a variety of components configured for various functions. In one configuration, the apparatus 1602, and in particular the baseband unit 1604, includes means for selecting at least one of one or more 2D beams for at least one first SSB of a plurality of SSBs or one or more 3D beams for at least one second SSB of the plurality of SSBs. The apparatus 1602 may include means for transmitting, to at least one UE, at least one of the at least one first SSB via the one or more 2D beams or the at least one second SSB via the one or more 3D beams. A beam type of at least one of the one or more 2D beams or the one or more 3D beams may be associated with at least one of one or more frequency resources or one or more PSS or SSS sequences.

In one configuration, the one or more 2D beams may be associated with SSB coverage including a near field and a far field. The one or more 3D beams may be associated with one or more SSB low-signal-strength holes in the near field. In one configuration, the one or more frequency resources or the one or more PSS or SSS sequences associated with the beam type may be preconfigured or predetermined. In one configuration, the at least one first SSB may be associated with a first frequency resource set. The at least one second SSB may be associated with a second frequency resource set different from the first frequency resource set. In one configuration, the at least one first SSB may be associated with a first PSS or SSS sequence set. The at least one second SSB may be associated with a second PSS or SSS sequence set different form the first PSS or SSS sequence set. In one configuration, a plurality of PBCHs of the plurality of SSBs may be associated with TDM. A plurality of PSS or SSS sequences of the plurality of SSBs may be associated with SDM. In one configuration, an SSB index of at least one SSB of the plurality of SSBs may be based on a corresponding PSS-to-PBCH interval. In one configuration, the apparatus 1602 may include means for transmitting, to the at least one UE, an indication of a threshold number of SSBs. The threshold number of SSBs may include more than 64 SSBs. In one configuration, the indication of the threshold number of SSBs may include a bitmap including a first number of bits corresponding to a first number of SSB positions. The first number may be greater than or equal to the threshold number. Each bit of the first number of bits in the bitmap may correspond to one respective SSB position of the first number of SSB positions. Each SSB of the threshold number of SSBs may correspond to one SSB position of the first number of SSB positions whose corresponding bits in the first bitmap are set. In one configuration, the indication of the threshold number of SSBs may include a first bitmap including a second number of bits corresponding to a second number of first SSB positions and one or more second bitmaps each including one or more bits corresponding to a corresponding set of second SSB positions of one or more second SSB positions. Each bit of the second number of bits in the first bitmap may correspond to one respective first SSB position. Each second bitmap of the one or more second bitmaps may correspond to one first SSB position of the second number of first SSB positions whose corresponding bits in the first bitmap are set. Each bit of the one or more bits in each second bitmap of the one or more second bitmaps may correspond to one respective second SSB position in the corresponding set of second SSB positions. Each SSB of the threshold number of SSBs may correspond to one first SSB position of the second number of first SSB positions whose corresponding bits in the first bitmap are set or one second SSB position of the one or more second SSB positions whose corresponding bits in the one or more second bitmaps are set. In one configuration, the indication of the threshold number of SSBs may be transmitted via an RRC message.

The means may be one or more of the components of the apparatus 1602 configured to perform the functions recited by the means. As described supra, the apparatus 1602 may include the TX Processor 316, the RX Processor 370, and the controller/processor 375. As such, in one configuration, the means may be the TX Processor 316, the RX Processor 370, and the controller/processor 375 configured to perform the functions recited by the means.

According to one or more aspects described herein, a base station may select at least one of one or more 2D beams for at least one first SSB of a plurality of SSBs or one or more 3D beams for at least one second SSB of the plurality of SSBs. A UE may identify a beam type of at least one of one or more 2D beams for at least one first SSB of a plurality of SSBs or one or more 3D beams for at least one second SSB of the plurality of SSBs. The base station may transmit, to the UE, at least one of the at least one first SSB via the one or more 2D beams or the at least one second SSB via the one or more 3D beams. A beam type of the at least one of the one or more 2D beams or the one or more 3D beams may be associated with at least one of one or more frequency resources or one or more PSS or SSS sequences. By using mixed 2D and 3D SSB beams and implicit indication of the beam type for SSB beams, satisfactory SSB coverage for the near field may be realized, and the beam determination latency and the UE power consumption in the initial access may be reduced. Transmitting the increased number of SSB beams with both TDM and SDM, as described above, may be associated with a lower radio resource consumption for the PSS or SSS than with TDM alone and a stronger signal power for the PBCH than with SDM alone. Further, the base station may transmit the indication of the presence or absence of an increased number of SSBs to connected UEs. A tradeoff between flexibility and signaling overhead may be considered in selecting the format of the indication.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory and configured to identify a beam type of at least one of one or more 2D beams for at least one first SSB of a plurality of SSBs or one or more 3D beams for at least one second SSB of the plurality of SSBs; and receive, from a base station, at least one of the at least one first SSB via the one or more 2D beams or the at least one second SSB via the one or more 3D beams, a beam type of the at least one of the one or more 2D beams or the one or more 3D beams being associated with at least one of one or more frequency resources or one or more PSS or SSS sequences.

Aspect 2 is the apparatus of aspect 1, where the one or more 2D beams are associated with SSB coverage including a near field and a far field, and the one or more 3D beams are associated with one or more SSB low-signal-strength holes in the near field.

Aspect 3 is the apparatus of any of aspects 1 and 2, where the one or more frequency resources or the one or more PSS or SSS sequences associated with the beam type are preconfigured or predetermined.

Aspect 4 is the apparatus of any of aspects 1 to 3, where the at least one first SSB is associated with a first frequency resource set, and the at least one second SSB is associated with a second frequency resource set different from the first frequency resource set.

Aspect 5 is the apparatus of any of aspects 1 to 3, where the at least one first SSB is associated with a first PSS or SSS sequence set, and the at least one second SSB is associated with a second PSS or SSS sequence set different form the first PSS or SSS sequence set.

Aspect 6 is the apparatus of any of aspects 1 to 5, where a plurality of PBCHs of the plurality of SSBs is associated with TDM, and a plurality of PSS or SSS sequences of the plurality of SSBs is associated with SDM.

Aspect 7 is the apparatus of aspect 6, the at least one processor being further configured to: identify an SSB index of at least one SSB of the plurality of SSBs based on a corresponding PSS-to-PBCH interval.

Aspect 8 is the apparatus of any of aspects 1 to 7, the at least one processor being further configured to: receive, from the base station, an indication of a threshold number of SSBs, where the threshold number of SSBs include more than 64 SSBs.

Aspect 9 is the apparatus of aspect 8, where the indication of the threshold number of SSBs includes a bitmap including a first number of bits corresponding to a first number of SSB positions, the first number being greater than or equal to the threshold number, each bit of the first number of bits in the bitmap corresponds to one respective SSB position of the first number of SSB positions, and each SSB of the threshold number of SSBs corresponds to one SSB position of the first number of SSB positions.

Aspect 10 is the apparatus of aspect 8, where the indication of the threshold number of SSBs includes a first bitmap including a second number of bits corresponding to a second number of first SSB positions and one or more second bitmaps each including one or more bits corresponding to a corresponding set of second SSB positions of one or more second SSB positions, each bit of the second number of bits in the first bitmap corresponds to one respective first SSB position, each bit of the one or more bits in each second bitmap of the one or more second bitmaps corresponds to one respective second SSB position in the corresponding set of second SSB positions, each second bitmap of the one or more second bitmaps corresponds to one set bit in the first bitmap, and each SSB of the threshold number of SSBs corresponds to one first SSB position of the second number of first SSB positions or one second SSB position of the one or more second SSB positions.

Aspect 11 is the apparatus of any of aspects 8 to 10, where the indication of the threshold number of SSBs is received via an RRC message.

Aspect 12 is the apparatus of any of aspects 1 to 11, further including a transceiver coupled to the at least one processor.

Aspect 13 is an apparatus for wireless communication at a base station including at least one processor coupled to a memory and configured to select at least one of one or more 2D beams for at least one first SSB of a plurality of SSBs or one or more 3D beams for at least one second SSB of the plurality of SSBs; and transmit, to at least one UE, at least one of the at least one first SSB via the one or more 2D beams or the at least one second SSB via the one or more 3D beams, a beam type of at least one of the one or more 2D beams or the one or more 3D beams being associated with at least one of one or more frequency resources or one or more PSS or SSS sequences.

Aspect 14 is the apparatus of aspect 13, where the one or more 2D beams are associated with SSB coverage including a near field and a far field, and the one or more 3D beams are associated with one or more SSB low-signal-strength holes in the near field.

Aspect 15 is the apparatus of any of aspects 13 and 14, where the one or more frequency resources or the one or more PSS or SSS sequences associated with the beam type are preconfigured or predetermined.

Aspect 16 is the apparatus of any of aspects 13 to 15, where the at least one first SSB is associated with a first frequency resource set, and the at least one second SSB is associated with a second frequency resource set different from the first frequency resource set.

Aspect 17 is the apparatus of any of aspects 13 to 15, where the at least one first SSB is associated with a first PSS or SSS sequence set, and the at least one second SSB is associated with a second PSS or SSS sequence set different form the first PSS or SSS sequence set.

Aspect 18 is the apparatus of any of aspects 13 to 17, where a plurality of PBCHs of the plurality of SSBs is associated with TDM, and a plurality of PSS or SSS sequences of the plurality of SSBs is associated with SDM.

Aspect 19 is the apparatus of aspect 18, where an SSB index of at least one SSB of the plurality of SSBs is based on a corresponding PSS-to-PBCH interval.

Aspect 20 is the apparatus of any of aspects 13 to 19, the at least one processor being further configured to: transmit, to the at least one UE, an indication of a threshold number of SSBs, where the threshold number of SSBs include more than 64 SSBs.

Aspect 21 is the apparatus of aspect 20, where the indication of the threshold number of SSBs includes a bitmap including a first number of bits corresponding to a first number of SSB positions, the first number being greater than or equal to the threshold number, each bit of the first number of bits in the bitmap corresponds to one respective SSB position of the first number of SSB positions, and each SSB of the threshold number of SSBs corresponds to one SSB position of the first number of SSB positions whose corresponding bits in the first bitmap are set.

Aspect 22 is the apparatus of aspect 20, where the indication of the threshold number of SSBs includes a first bitmap including a second number of bits corresponding to a second number of first SSB positions and one or more second bitmaps each including one or more bits corresponding to a corresponding set of second SSB positions of one or more second SSB positions, each bit of the second number of bits in the first bitmap corresponds to one respective first SSB position, each second bitmap of the one or more second bitmaps corresponds to one first SSB position of the second number of first SSB positions whose corresponding bits in the first bitmap are set, each bit of the one or more bits in each second bitmap of the one or more second bitmaps corresponds to one respective second SSB position in the corresponding set of second SSB positions, and each SSB of the threshold number of SSBs corresponds to one first SSB position of the second number of first SSB positions whose corresponding bits in the first bitmap are set or one second SSB position of the one or more second SSB positions whose corresponding bits in the one or more second bitmaps are set.

Aspect 23 is the apparatus of any of aspects 20 to 22, where the indication of the threshold number of SSBs is transmitted via an RRC message.

Aspect 24 is the apparatus of any of aspects 13 to 23, further including a transceiver coupled to the at least one processor.

Aspect 25 is a method of wireless communication for implementing any of aspects 1 to 24.

Aspect 26 is an apparatus for wireless communication including means for implementing any of aspects 1 to 24.

Aspect 27 is a computer-readable medium storing computer executable code, where the code when executed by a processor causes the processor to implement any of aspects 1 to 24.

What is claimed is:

1. An apparatus for wireless communication at a user equipment (UE), comprising:
  - a memory; and
  - at least one processor coupled to the memory and configured to:
    - receive, from a base station, a plurality of synchronization signal blocks (SSBs), wherein the plurality of SSBs comprise one or more two-dimensional (2D) beams that focus transmission power in an azimuth and a zenith and comprise one or more three-dimensional (3D) beams that focus transmission power in a direction and a distance; and
    - identify at least one first SSB of the plurality of SSBs as the one or more 2D beams based on a first frequency resource, a first primary synchronization signal (PSS) sequence, or a first secondary synchronization signal (SSS) sequence associated with the at least one first SSB and identify at least one second SSB as the one or more 3D beams based on a second frequency resource, a second PSS sequence, or a second SSS sequence associated with the at least one second SSB.

2. The apparatus of claim 1, wherein the one or more 2D beams are associated with SSB coverage including a near field and a far field, and the one or more 3D beams are associated with one or more SSB low-signal-strength holes in the near field.

3. The apparatus of claim 1, wherein at least one of the first frequency resource and the second frequency resource, the first PSS sequence and the second PSS sequence, or the first SSS sequence and the second SSS sequence are pre-configured or predetermined.

4. The apparatus of claim 1, wherein, to identify the at least one first SSB as the one or more 2D beams and identify the at least one second SSB as the one or more 3D beams, the at least one processor is configured to:
  - identify the at least one first SSB as the one or more 2D beams based on identifying the first frequency resource of the at least one first SSB as belonging to a first frequency resource set; and
  - identify the at least one second SSB as the one or more 3D beams based on identifying the second frequency resource of the at least one second SSB as belonging to a second frequency resource set different from the first frequency resource set.

5. The apparatus of claim 1, wherein, to identify the at least one first SSB as the one or more 2D beams and identify the at least one second SSB as the one or more 3D beams, the at least one processor is configured to:
  - identify the at least one first SSB as the one or more 2D beams based on identifying the first PSS sequence or the first SSS sequence of the at least one first SSB as belonging to a first PSS sequence set or a first SSS sequence set; and
  - identify the at least one second SSB as the one or more 3D beams based on identifying the second PSS sequence or the second SSS sequence of the at least one second SSB as belonging to a second PSS sequence set different from the first PSS sequence set.

6. The apparatus of claim 1, wherein, to receive the plurality of SSBs, the at least processor is configured to:
  - receive the plurality of SSBs using a plurality of physical broadcast channels (PBCHs) associated with time division multiplexing (TDM), wherein a plurality of PSS or SSS sequences of the plurality of SSBs is associated with spatial division multiplexing (SDM).

7. The apparatus of claim 6, wherein the at least one processor is further configured to:
  - identify an SSB index of at least one SSB of the plurality of SSBs based on a corresponding PSS-to-PBCH interval associated with the first PSS sequence or the second PSS sequence.

8. The apparatus of claim 1, wherein the at least one processor is further configured to:
  - receive, from the base station, an indication of a threshold number of SSBs, wherein the threshold number of SSBs include more than 64 SSBs.

9. The apparatus of claim 8, wherein the indication of the threshold number of SSBs comprises a bitmap including a first number of bits corresponding to a first number of SSB positions, the first number being greater than or equal to the threshold number, each bit of the first number of bits in the bitmap corresponds to one respective SSB position of the first number of SSB positions, and each SSB of the threshold number of SSBs corresponds to one SSB position of the first number of SSB positions.

10. The apparatus of claim 8, wherein the indication of the threshold number of SSBs comprises a first bitmap including a second number of bits corresponding to a second number of first SSB positions and one or more second bitmaps each including one or more bits corresponding to a corresponding set of second SSB positions of one or more second SSB positions, each bit of the second number of bits in the first bitmap corresponds to one respective first SSB position, each bit of the one or more bits in each second bitmap of the one or more second bitmaps corresponds to one respective second SSB position in the corresponding set of second SSB positions, each second bitmap of the one or more second bitmaps corresponds to one set bit in the first bitmap, and each SSB of the threshold number of SSBs corresponds to one first SSB position of the second number of first SSB positions or one second SSB position of the one or more second SSB positions.

11. The apparatus of claim 8, wherein, to receive the indication of the threshold number of SSBs, the at least one processor is configured to:

receive the indication of the threshold number of SSBs via a radio resource control (RRC) message.

12. The apparatus of claim 1, further comprising a transceiver coupled to the at least one processor, wherein, to receive the plurality of SSBs, the at least one processor is configured to:

receive the plurality of SSBs via the transceiver.

13. A method of wireless communication at a user equipment (UE), comprising:

receiving, from a base station, a plurality of synchronization signal blocks (SSBs), wherein the plurality of SSBs comprise one or more two-dimensional (2D) beams that focus transmission power in an azimuth and a zenith and comprise one or more three-dimensional (3D) beams that focus transmission power in a direction and a distance; and identifying at least one first SSB of the plurality of SSBs as the one or more 2D beams based on a first frequency resource, a first primary synchronization signal (PSS) sequence, or a first secondary synchronization signal (SSS) sequence associated with the at least one first SSB and identify at least one second SSB as the one or more 3D beams based on a second frequency resource, a second PSS sequence, or a second SSS sequence associated with the at least one second SSB.

14. The method of claim 13, wherein the one or more 2D beams are associated with SSB coverage including a near field and a far field, and the one or more 3D beams are associated with one or more SSB low-signal-strength holes in the near field.

15. The method of claim 13, wherein at least one of the first frequency resource and the second frequency resource, the first PSS sequence and the second PSS sequence, or the first SSS sequence and the second SSS sequence are preconfigured or predetermined.

16. An apparatus for wireless communication at a base station, comprising:

memory; and at least one processor coupled to the memory and configured to:

select at least one of one or more two-dimensional (2D) beams for at least one first synchronization signal block (SSB) of a plurality of SSBs and one or more three-dimensional (3D) beams for at least one second SSB of the plurality of SSBs; and transmit, to at least one user equipment (UE), the at least one first SSB via the one or more 2D beams and the at least one second SSB via the one or more 3D beams, wherein a first beam type of at least one of the one or more 2D beams is associated with at least one of a first frequency resource, a first primary synchronization signal (PSS) sequence, or a first secondary synchronization signal (SSS) sequence and a second beam type of at least one of the one or more 3D beams is associated with at least one of a second frequency resource, a second PSS sequence, or a second SSS sequence.

17. The apparatus of claim 16, wherein the one or more 2D beams are associated with SSB coverage including a near field and a far field, and the one or more 3D beams are associated with one or more SSB low-signal-strength holes in the near field.

18. The apparatus of claim 16, wherein at least one of the first frequency resource and the second frequency resource, the first PSS sequence and the second PSS sequence, or the first SSS sequence and the second SSS sequence are preconfigured or predetermined.

19. The apparatus of claim 16, wherein, to transmit the at least one first SSB via the one or more 2D beams and the at least one second SSB via the one or more 3D beams, the at least one processor is configured to:

transmit the at least one first SSB using a first frequency resource set; and transmit the at least one second SSB using a second frequency resource set different from the first frequency resource set.

20. The apparatus of claim 16, wherein, to transmit the at least one first SSB via the one or more 2D beams and the at least one second SSB via the one or more 3D beams, the at least one processor is configured to:

transmit the at least one first SSB using a first PSS sequence set or a first SSS sequence set; and transmit the at least one second SSB using a second PSS sequence set or a second SSS sequence set different from the first PSS sequence set or the first SSS sequence set.

21. The apparatus of claim 16, wherein, to transmit the at least one first SSB via the one or more 2D beams and the at least one second SSB via the one or more 3D beams, the at least one processor is configured to:

transmit the plurality of SSBs using a plurality of physical broadcast channels (PBCHs) associated with time division multiplexing (TDM), wherein a plurality of PSS or SSS sequences of the plurality of SSBs is associated with spatial division multiplexing (SDM).

22. The apparatus of claim 21, wherein an SSB index of at least one SSB of the plurality of SSBs is based on a corresponding PSS-to-PBCH interval.

23. The apparatus of claim 16, wherein the at least one processor is further configured to:

transmit, to the at least one UE, an indication of a threshold number of SSBs, wherein the threshold number of SSBs include more than 64 SSBs.

24. The apparatus of claim 23, wherein the indication of the threshold number of SSBs comprises a bitmap including a first number of bits corresponding to a first number of SSB positions, the first number being greater than or equal to the threshold number, each bit of the first number of bits in the bitmap corresponds to one respective SSB position of the first number of SSB positions, and each SSB of the threshold number of SSBs corresponds to one SSB position of the first number of SSB positions whose corresponding bits in the first bitmap are set.

25. The apparatus of claim 23, wherein the indication of the threshold number of SSBs comprises a first bitmap including a second number of bits corresponding to a second number of first SSB positions and one or more second bitmaps each including one or more bits corresponding to a corresponding set of second SSB positions of one or more second SSB positions, each bit of the second number of bits in the first bitmap corresponds to one respective first SSB position, each second bitmap of the one or more second bitmaps corresponds to one first SSB position of the second number of first SSB positions whose corresponding bits in the first bitmap are set, each bit of the one or more bits in each second bitmap of the one or more second bitmaps corresponds to one respective second SSB position in the corresponding set of second SSB positions, and each SSB of the threshold number of SSBs corresponds to one first SSB position of the second number of first SSB positions whose corresponding bits in the first bitmap are set or one second SSB position of the one or more second SSB positions whose corresponding bits in the one or more second bitmaps are set.

26. The apparatus of claim 23, wherein, to transmit the indication of the threshold number of SSBs, the at least one processor is configured to:

transmit the indication of the threshold number of SSBs via a radio resource control (RRC) message.

27. The apparatus of claim 16, further comprising a transceiver coupled to the at least one processor, wherein, to transmit the at least one first SSB via the one or more 2D beams and the at least one second SSB via the one or more 3D beams, the at least one processor is configured to:

transmit the at least one first SSB via the one or more 2D beams and the at least one second SSB via the one or more 3D beams via the transceiver.

28. A method of wireless communication at a base station, comprising:

selecting at least one of one or more two-dimensional (2D) beams for at least one first synchronization signal block (SSB) of a plurality of SSBs and one or more three-dimensional (3D) beams for at least one second SSB of the plurality of SSBs; and transmitting, to at least one user equipment (UE), the at least one first SSB via the one or more 2D beams and the at least one second SSB via the one or more 3D beams, wherein a first beam type of at least one of the one or more 2D beams is associated with at least one of a first frequency resource, a first primary synchronization signal (PSS) sequence, or a first secondary synchronization signal (SSS) sequence and a second beam type of at least one of the one or more 3D beams is associated with at least one of a second frequency resource, a second PSS sequence, or a second SSS sequence.

29. The method of claim 28, wherein the one or more 2D beams are associated with SSB coverage including a near field and a far field, and the one or more 3D beams are associated with one or more SSB low-signal-strength holes in the near field.

30. The method of claim 28, wherein at least one of the first frequency resource and the second frequency resource, the first PSS sequence and the second PSS sequence, or the first SSS sequence and the second SSS sequence are pre-configured or predetermined.

* * * * *